US012640479B2

(12) United States Patent
Zhang et al.

(10) Patent No.: US 12,640,479 B2
(45) Date of Patent: May 26, 2026

(54) ANTENNA AND ELECTRONIC DEVICE

(71) Applicant: HUAWEI TECHNOLOGIES CO., LTD., Shenzhen (CN)

(72) Inventors: Xiuyin Zhang, Guangzhou (CN); Di Pang, Guangzhou (CN); Huafeng Su, Guangzhou (CN); Huiliang Xu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 41 days.

(21) Appl. No.: 18/722,569

(22) PCT Filed: Dec. 12, 2022

(86) PCT No.: PCT/CN2022/138413
§ 371 (c)(1),
(2) Date: Jun. 20, 2024

(87) PCT Pub. No.: WO2023/134359
PCT Pub. Date: Jul. 20, 2023

(65) Prior Publication Data

US 2025/0105510 A1 Mar. 27, 2025

(30) Foreign Application Priority Data

Jan. 17, 2022 (CN) ......................... 202210050320.2

(51) Int. Cl.
*H01Q 5/328* (2015.01)
*H01Q 3/26* (2006.01)
*H01Q 13/08* (2006.01)

(52) U.S. Cl.
CPC ........... *H01Q 5/328* (2015.01); *H01Q 3/2611* (2013.01); *H01Q 13/08* (2013.01)

(58) Field of Classification Search
CPC ....... H01Q 5/328; H01Q 3/2611; H01Q 13/08
See application file for complete search history.

(56) References Cited

U.S. PATENT DOCUMENTS 5,420,596 A * 5/1995 Burrell .................. H01Q 1/243 343/848

FOREIGN PATENT DOCUMENTS

CN 113809524 A 12/2021
JP 2001156544 A 6/2001
TW 201807886 A 3/2018

OTHER PUBLICATIONS

J. -F. Qian, F. -C. Chen, Q. -X. Chu, Q. Xue and M. J. Lancaster, "A Novel Electric and Magnetic Gap-Coupled Broadband Patch Antenna With Improved Selectivity and Its Application in MIMO System," in IEEE Transactions on Antennas and Propagation, vol. 66, No. 10, pp. 5625-5629, Oct. 2018, doi: 10.1109/TAP.2018.2860129.

(Continued)

*Primary Examiner* — Graham P Smith

(57) ABSTRACT

An antenna comprises a feeding element and a plurality of radiators including a first radiator, a second radiator, and a third radiator spaced from each other side by side in a first direction on a same plane. One end of the feeding element is connected to a feeding connection point of the first radiator, and the other end is connected to a feeding point. The antenna further includes a first ground element, a second ground element, a third ground element, and a fourth ground element that are spaced from each other in the first direction. A first gap is formed between the second radiator and the first radiator, and a second gap is formed between the third radiator and the first radiator.

18 Claims, 20 Drawing Sheets

(56) References Cited

OTHER PUBLICATIONS

C. -K. Lin and S. -J. Chung, "A Compact Filtering Microstrip Antenna With Quasi-Elliptic Broadside Antenna Gain Response," in IEEE Antennas and Wireless Propagation Letters, vol. 10, pp. 381-384, Apr. 29, 2011, doi: 10.1109/LAWP.2011.2147750.
M. -C. Tang, Y. Wang, Y. Chen and R. W. Ziolkowski, "Designs of Compact, Planar, Wideband, Monopole Filtennas with Near-Field Resonant Parasitic Elements," 2018 IEEE International Conference on Computational Electromagnetics (ICCEM), Chengdu, China, Oct. 18, 2018, pp. 1-3, doi: 10.1109/COMPEM.2018.8496508.
K. -R. Xiang, F. -C. Chen, Q. Tan and Q. -X. Chu, "High-Selectivity Filtering Patch Antennas Based on MultiPath Coupling Structures," in IEEE Transactions on Microwave Theory and Techniques, vol. 69, No. 4, pp. 2201-2210, Apr. 2021, doi: 10.1109/TMTT.2021.3056552.
Y. M. Pan, P. F. Hu, K. W. Leung and X. Y. Zhang, "Compact Single-/Dual-Polarized Filtering Dielectric Resonator Antennas," in IEEE Transactions on Antennas and Propagation, vol. 66, No. 9, pp. 4474-4484, Sep. 2018, doi: 10.1109/TAP.2018.2845457.
K. -Z. Hu, M. -C. Tang, D. Li, Y. Wang and M. Li, "Design of Compact, Single-Layered Substrate Integrated Waveguide Filtenna With Parasitic Patch," in IEEE Transactions on Antennas and Propagation, vol. 68, No. 2, pp. 1134-1139, Feb. 2020, doi: 10.1109/TAP.2019.2938574.
N. -W. Liu, Y. -D. Liang, L. Zhu, Z. -X. Liu and G. Fu, "A Low-Profile, Wideband, Filtering-Response, Omnidirectional Dielectric Resonator Antenna Without Enlarged Size and Extra Feeding Circuit," in IEEE Antennas and Wireless Propagation Letters, vol. 20, No. 7, pp. 1120-1124, Jul. 2021, doi: 10.1109/LAWP.2021.3072062.
J. S. Hong and M. J. Lancaster, Microstrip Filters for RF/Microwave Applications. New York: Wiley, 2001, 476 pages.
Duan Wen:"Research on Multi-Functional Antennas with FilteringPower Combining Capability",Apr. 9, 2019, total 149 pages.
X. Y. Zhang, W. Duan and Y. -M. Pan, "High-Gain Filtering Patch Antenna Without Extra Circuit," in IEEE Transactions on Antennas and Propagation, vol. 63, No. 12, pp. 5883-5888, Dec. 2015, doi: 10.1109/TAP.2015.2481484.
Y. M. Pan et al. Parasitic Patch Antenna with Filtering Response, 2016 IEEE 5th Asia-Pacific Conference on Antennas and Propagation (APCAP), Jul. 26-29, 2016, total 2 pages.

* cited by examiner

ANTENNA AND ELECTRONIC DEVICE

CROSS-REFERENCE TO RELATED APPLICATIONS

This application is a National Stage of International Application No. PCT/CN2022/138413, filed on Dec. 12, 2022, which claims priority to Chinese Patent Application No. 202210050320.2, filed on Jan. 17, 2022, both of which are hereby incorporated by reference in their entireties.

TECHNICAL FIELD

This application relates to the antenna field, and in particular, to an antenna and an electronic device.

BACKGROUND

With development and progress of electronic devices, a plurality of different-frequency antennas usually need to be disposed in the electronic device, to implement different signal receiving and sending functions. Due to limited space in the electronic device, isolation between different-frequency antennas is difficult to meet a requirement. Especially if the different-frequency antennas operate in adjacent frequency bands in a spectrum, mutual interference is more serious. A mobile phone is used as an example. Antennas operating in a GSM1800/1900 frequency band cause spurious interference to a global navigation satellite system (Global Navigation Satellite System, GNSS). As a result, it is difficult for a cellular communications system and a wireless fidelity (wireless fidelity, Wi-Fi) communications technology in the mobile phone to coexist. Once the cellular communications system and the wireless fidelity communications technology operate simultaneously, mutual interference exists. Therefore, the coexistence of the cellular communications system and a Wi-Fi system becomes a problem troubling the industry.

In a conventional technology, a channel blocking or avoidance method is usually applied by using hardware (for example, a high-suppression coexistence filter), to resolve interference between different-frequency antennas (for example, a cellular communications system and a Wi-Fi system). For example, a frequency band 7/band 41 of the cellular communications system may interfere with a high channel of Wi-Fi. Therefore, in actual use, a solution in which the high-suppression coexistence filter is used to block the high channel may be applied based on an interference status, to resolve the interference.

However, because channel blocking is likely to affect operating statuses of other components of the electronic device, some components or some functions cannot be used, and normal use of the electronic device is affected.

It can be learned that, in the conventional technology, poor isolation exists between the different-frequency antennas of the electronic device.

SUMMARY

An objective of this application is to resolve the poor isolation between the different-frequency antennas of the electronic device in the conventional technology. Therefore, embodiments provide an antenna and an electronic device, to construct a new antenna structure. The antenna is capable of generating two radiation nulls outside an operating frequency band of the antenna. This helps the antenna implement a filtering function without changing a radiation characteristic of the antenna, further improves isolation between different-frequency antennas of the electronic device, and helps improve an anti-interference capability of the electronic device.

An embodiment of this application provides an antenna, including:

- a plurality of radiators, where the plurality of radiators include a first radiator, a second radiator, and a third radiator that are spaced from each other side by side in a first direction on a same plane, the second radiator and the third radiator are respectively located on two sides of the first radiator, a first gap is formed between the second radiator and the first radiator, and a second gap is formed between the third radiator and the first radiator; and the first radiator, the second radiator, and the third radiator are all spaced from the ground and disposed opposite to the group in a second direction;
- a feeding element, where one end of the feeding element is connected to a feeding connection point of the first radiator, and the other end is connected to a feeding point;
- a first ground element, a second ground element, a third ground element, and a fourth ground element that are spaced from each other in the first direction, where one end of the first ground element is connected to a first ground point of the first radiator, and the other end is grounded; one end of the second ground element is connected to a second ground point of the first radiator, and the other end is grounded; both the first ground element and the second ground element are spaced from the feeding element in a third direction; one end of the third ground element is connected to a ground point of the second radiator, and the other end is grounded; and one end of the fourth ground element is connected to a ground point of the third radiator, and the other end is grounded; and
- the first direction, the second direction, and the third direction are perpendicular to each other, the first direction is parallel to a width direction of the first radiator, and the third direction is parallel to a length direction of the first radiator.

In this embodiment of this application, the first radiator, the second radiator, and the third radiator are spaced from each other side by side, and the first ground element, the second ground element, the third ground element, the fourth ground element, and the feeding element are connected to corresponding radiators, to form a new antenna structure. In this way, a hybrid coupling of an electrical coupling and a magnetic coupling can be simultaneously formed between the radiators. This helps ensure that the antenna is capable of generating two radiation nulls (or may be understood as points with extremely low antenna efficiency) outside an operating frequency band by changing a proportion of the electrical coupling and the magnetic coupling in a total coupling through the first gap and the second gap under a condition that a total coupling strength of the antenna remains unchanged. This implements a filtering function without changing a radiation characteristic of the antenna, helps improve isolation between different-frequency antennas of the electronic device, and lays a foundation for improving an anti-interference capability of the electronic device.

In addition, the antenna in this embodiment of this application has features such as a simple feeding structure, a compact antenna structure, and a small size. This may contribute to miniaturization, lightness and thinness of the electronic device when the antenna is used in the electronic device.

In some embodiments, the first gap enables an electrical coupling strength between the first radiator and the second radiator to be a first target strength at a first target frequency point, and the second gap enables an electrical coupling strength between the first radiator and the third radiator to be a second target strength at a second target frequency point. An operating frequency band of the antenna is between the first target frequency point and the second target frequency point.

In some embodiments, the antenna has a radiation null at the first target frequency point and the second target frequency point.

In this embodiment of this application, the first gap and the second gap enable one radiation null (or may be understood as a point with extremely low antenna efficiency) to be generated at each of the two target frequencies under a condition that the total coupling strength of the antenna remains unchanged. When a frequency of a radio frequency signal received by the antenna is at a frequency point of the radiation null or is at a frequency point outside the operating frequency band of the antenna, the antenna has extremely low efficiency and cannot operate normally. In this embodiment of this application, the operating frequency band of the antenna is between the two target frequencies. Therefore, in this embodiment of this application, antenna efficiency is relatively high in the operating frequency band of the antenna, and the antenna efficiency is relatively low outside the operating frequency band of the antenna. Therefore, the antenna efficiency shows relatively high edge selectivity. This implements a filtering function, helps improve isolation between different-frequency antennas of the electronic device, and further improves an anti-interference capability of the electronic device.

In some embodiments, the first radiator, the second radiator, and the third radiator are all in a strip shape.

In some possible embodiments, at least one widened portion and/or at least one narrowed portion are disposed on at least one of the first radiator, the second radiator, and the third radiator.

In some possible embodiments, widened portions are disposed on two sides that are of a first end and a second end of the first radiator and that are close to the second radiator.

In some possible embodiments, a narrowed portion is disposed on one side that is of a second end of the first radiator and that is close to the third radiator.

In some possible embodiments, widened portions are disposed on two sides of a radiator section in which the first ground point and the second ground point of the first radiator are located.

In some possible embodiments, a narrowed portion is disposed on the second radiator, on one side of the ground point of the second radiator, and on one side that is of a radiator section close to the feeding point and that is close to the first radiator.

In some possible embodiments, a narrowed portion is disposed on the third radiator, on one side of the ground point of the third radiator, and on one side that is of a radiator section close to the feeding point and that is close to the first radiator.

In some possible embodiments, the first radiator includes a first radiator section, a primary radiator section, a second radiator section, a third radiator section, and a fourth radiator section that are sequentially connected in the length direction of the first radiator. The first ground point and the second ground point are disposed on the second radiator section. The feeding connection point is disposed on the third radiator section.

A plane parallel to a cross section of the first radiator is used as a first projection plane. A projection of the primary radiator section on the first projection plane is located in a projection of the second radiator section on the first projection plane. A projection of the third radiator section on the first projection plane covers the projection of the primary radiator section on the first projection plane, and is located in the projection of the second radiator section on the first projection plane. A projection of the first radiator section on the first projection plane covers the projection of the primary radiator section on the first projection plane, and is located in the projection of the second radiator section on the first projection plane. A part of a projection of the fourth radiator section on the first projection plane is located in the projection of the primary radiator section on the first projection plane, and a remaining part is located outside the projection of the primary radiator section on the first projection plane. A center line of the primary radiator section, a center line of the second radiator section, and a center line of the third radiator section overlap. Both a center line of the first radiator section and a center line of the fourth radiator section are located between the center line of the primary radiator section and the second radiator.

The second radiator includes a primary radiator section and a secondary radiator section that are sequentially connected in a length direction of the second radiator. The ground point of the second radiator is disposed on the primary radiator section of the second radiator.

A projection of the secondary radiator section of the second radiator on the first projection plane is located in a projection of the primary radiator section of the second radiator on the first projection plane. A center line of the secondary radiator section of the second radiator is located on one side that is of a center line of the primary radiator section of the second radiator and that is away from the first radiator.

The third radiator includes a primary radiator section and a secondary radiator section that are sequentially connected in a length direction of the third radiator. The ground point of the third radiator is disposed on the primary radiator section of the third radiator.

A projection of the secondary radiator section of the third radiator on the first projection plane is located in a projection of the primary radiator section of the third radiator on the first projection plane. A center line of the secondary radiator section of the third radiator is located on one side that is of a center line of the primary radiator section of the third radiator and that is away from the first radiator.

In some possible embodiments, the ground point of the second radiator is disposed on a radiator section that is in the primary radiator section of the second radiator and that is close to the secondary radiator section of the second radiator. The ground point of the third radiator is disposed on a radiator section that is in the primary radiator section of the third radiator and that is close to the secondary radiator section of the third radiator.

In some possible embodiments, a plane parallel to a longitudinal section of the first radiator is used as a second projection plane. A projection of the primary radiator section of the third radiator on the second projection plane is located in a projection of the primary radiator section of the second radiator on the second projection plane. A projection of the secondary radiator section of the third radiator on the second projection plane is located in a projection of the secondary radiator section of the second radiator on the second projection plane. A projection of the first radiator section of the first radiator on the second projection plane is located outside a projection of the primary radiator section of the third radiator on the second projection plane. A part of a projection of the fourth radiator section on the second projection plane is located in the projection of the secondary radiator section of the third radiator on the second projection plane, and a remaining part is located outside the projection of the secondary radiator section of the third radiator on the second projection plane.

In some possible embodiments, projections of the primary radiator section and the second radiator section of the first radiator on the second projection plane are located in the projection of the primary radiator section of the third radiator on the second projection plane.

In some embodiments, in the third direction, both ends of the second radiator are located between two ends of the first radiator, and both ends of the third radiator are located between two ends of the second radiator.

In some embodiments, each of the plurality of radiators is capable of generating at least two resonances, and resonance frequency points corresponding to the at least two resonances generated by each radiator are in different operating frequency bands of the antenna.

In some embodiments, a first resonance frequency point of each of the plurality of radiators is in a first operating frequency band of the antenna.

In some embodiments, a second resonance frequency point of each of the plurality of radiators is in a second operating frequency band of the antenna.

In some embodiments, in a third direction, radiator sections in the first radiator that are located on two sides of the feeding connection point are respectively configured to generate a first resonance frequency point and a second resonance frequency point of the first radiator.

In a third direction, radiator sections in the second radiator that are located on two sides of the ground point of the second radiator are respectively configured to generate a first resonance frequency point and a second resonance frequency point of the second radiator.

In the third direction, radiator sections in the third radiator that are located on two sides of the ground point of the third radiator are respectively configured to generate a first resonance frequency point and a second resonance frequency point of the third radiator.

The first resonance frequency point of the first radiator, the first resonance frequency point of the second radiator, and the first resonance frequency point of the third radiator are all in the first operating frequency band of the antenna.

The second resonance frequency point of the first radiator, the second resonance frequency point of the second radiator, and the second resonance frequency point of the third radiator are all in the second operating frequency band of the antenna.

In some embodiments, in the third direction, in the first radiator, an electrical length of a radiator section located on one side of the feeding connection point is ¼ of an operating wavelength corresponding to the first resonance frequency point of the first radiator; and an electrical length of a radiator section located on the other side of the feeding connection point is ¼ of an operating wavelength corresponding to the second resonance frequency point of the first radiator.

In the third direction, in the second radiator, an electrical length of a radiator section located on one side of the ground point of the second radiator is ¼ of an operating wavelength corresponding to the first resonance frequency point of the second radiator; and an electrical length of a radiator section located on the other side of the ground point of the second radiator is ¼ of an operating wavelength corresponding to the second resonance frequency point of the second radiator.

In the third direction, in the third radiator, an electrical length of a radiator section located on one side of the ground point of the third radiator is ¼ of an operating wavelength corresponding to the first resonance frequency point of the third radiator; and an electrical length of a radiator section located on the other side of the ground point of the third radiator is ¼ of an operating wavelength corresponding to the second resonance frequency point of the third radiator.

In some possible embodiments, the antenna is a dual-band Wi-Fi antenna, the first operating frequency band of the antenna is 2.4 GHz to 2.52 GHZ, and the second operating frequency band of the antenna is 5 GHz to 5.88 GHz.

In some possible embodiments, the feeding connection point is located at ⅓ of the first radiator in the length direction of the first radiator.

In some possible embodiments, both the first ground point and the second ground point are located at ⅓ of the first radiator in the length direction of the first radiator.

In some possible embodiments, in the third direction, the first ground point, the second ground point, the ground point of the second radiator, and the ground point of the third radiator are all located on a same side of the feeding ground point.

In some embodiments, in the first direction, the first ground point is located between the second ground point and the ground point of the second radiator, and a spacing between the first ground point and the second ground point, a spacing between the first ground point and the ground point of the second radiator, and a spacing between the second ground point and the ground point of the third radiator are all less than or equal to 10 mm.

In some embodiments, in the first direction, the spacing d1 between the first ground point and the second ground point is 0.4 mm≤d1≤4.4 mm, the spacing d2 between the first ground point and the ground point of the second radiator is 0.6 mm≤d2≤4.6 mm, and the spacing d3 between the second ground point and the ground point of the third radiator is: 0.5 mm≤d3≤4.5 mm.

In some embodiments, in the third direction, a spacing between the first ground point and the second ground point, a spacing between the ground point of the second radiator and the first ground point, and a spacing between the ground point of the third radiator and the second ground point are all less than or equal to 10 mm.

In some embodiments, at least some of the first ground element, the second ground element, the third ground element, and the fourth ground element are disposed in a staggered manner in the third direction.

In some possible embodiments, the first ground element and the second ground element are aligned in the third direction.

In some possible embodiments, the third ground element and the fourth ground element are aligned in the third direction.

In some embodiments, a height h0 of the antenna is 4 mm≤h0≤6 mm.

In some possible embodiments, a height h0 of the antenna is 5 mm.

In some embodiments, the feeding element, the first ground element, the second ground element, the third ground element, and the fourth ground element are all disposed in an extended manner in the second direction.

In some possible embodiments, a cross section of the feeding element, a cross section of the first ground element, a cross section of the second ground element, a cross section of the third ground element, and a cross section of the fourth ground element are all in a circular shape or rectangular shape.

An embodiment of this application provides an electronic device, including the antenna provided in any one of the foregoing embodiments or any possible embodiment.

In some possible embodiments, the antenna is located at an edge of a floor of the electronic device.

In some embodiments, each of the first radiator, the second radiator, and the third radiator is formed by a conductive element of the electronic device.

Each of the feeding element, the first ground element, the second ground element, the third ground element, and the fourth ground element is formed by a conductive element of the electronic device.

In some possible embodiments, the electronic device further includes a bracket, and the antenna is supported and fastened in the electronic device by using the bracket.

REFERENCE NUMERALS

Figure 1:
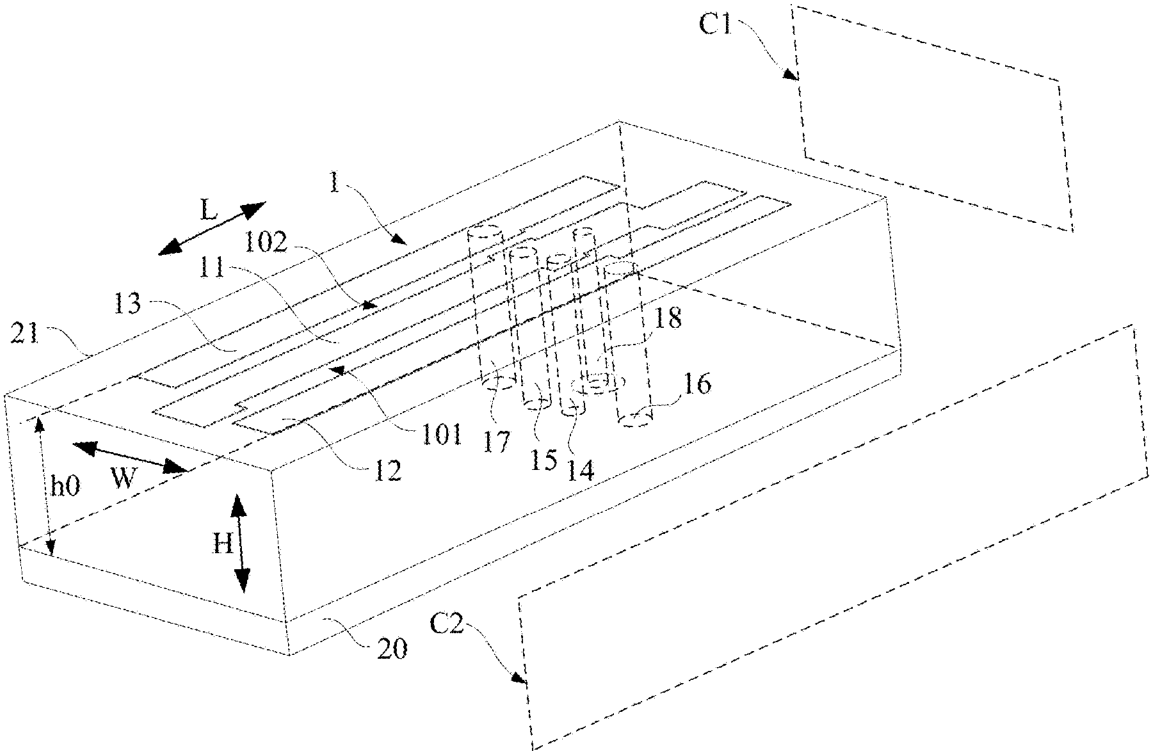
FIG. 1 is a schematic diagram of a three-dimensional structure of an antenna according to an embodiment of this application.

1: antenna;

11: first radiator; 110: primary radiator section; 111: first radiator section; 112: second radiator section; 113: third radiator section; 114: fourth radiator section; 12: second radiator; 121: primary radiator section; 122: secondary radiator section; 13: third radiator; 131: primary radiator section; 132: secondary radiator section;

101: first gap; 102: second gap; 14: first ground element; 15: second ground element; 16: third ground element; 17: fourth ground element; 18: feeding element;

A0: feeding connection point; B1: first ground point; B2: second ground point; B3: ground point; B4: ground point;

E1, E2, E3, and E4: widened portions; F1, F2, and F3: narrowed portions;

2: electronic device;

20: PCB; 21: bracket; 22: shark fin floor; 23: housing; 24: primary antenna;

C1: first projection plane; C2: second projection plane;

S1: first area; S2: second area; S3: third area; S4: fourth area;

1A: antenna;

11A: first radiator; 111A: primary radiator section; 112A: secondary radiator section; 12A: second radiator;

121A: primary radiator section; 122A: secondary radiator section; 13A: third radiator; 131A: primary radiator section; 132A: secondary radiator section;

101A: first gap; 102A: second gap; 103A: third gap; 15A: first ground element; 16A: second ground element; 18A: feeding element; 181A: first node; 182A: second node; RF: radio frequency source;

20A: PCB; 201A: dielectric substrate; 202A: ground metal layer; 21A: bracket; 211A: bracket body; 212A: connection portion; 213A: connection portion; 22A: shark fin floor; 24A: primary antenna;

W: first direction; H: second direction; L: third direction.

DESCRIPTION OF EMBODIMENTS

Implementations of this application are described below in specific embodiments, and other advantages and effects of this application may be readily understood by a person skilled in the art from content disclosed in this specification. Although this application is described with reference to some embodiments, it does not mean that a characteristic of this application is limited only to this implementation. On the contrary, a purpose of describing this application with reference to an implementation is to cover another option or modification that may be derived based on claims of this application. To provide an in-depth understanding of this application, the following descriptions include a plurality of specific details. This application may be alternatively implemented without using these details. In addition, to avoid confusion or blurring a focus of this application, some specific details are omitted from the description. It should be noted that embodiments in this application and the features in embodiments may be mutually combined in the case of no conflict.

It should be noted that, in this specification, similar reference numerals and letters in the following accompanying drawings indicate similar items. Therefore, once an item is defined in an accompanying drawing, the item does not need to be further defined or interpreted in following accompanying drawings.

The following describes terms that may occur in embodiments of this application.

In descriptions of this application, it should be noted that orientation or location relationships indicated by terms "center", "above", "below", "left", "right", "vertical", "horizontal", "inner", "outer", and the like are orientation or location relationships based on the accompanying drawings, and are merely intended for ease of describing this application and simplifying description, rather than indicating or implying that an apparatus or element in question needs to have a specific orientation or needs to be constructed and operated in a specific orientation. Therefore, such terms cannot be construed as a limitation on this application. In addition, terms "first" and "second" are merely used for a purpose of description, and shall not be understood as an indication or implication of relative importance.

In descriptions of this application, it should be noted that unless otherwise expressly specified and limited, terms "mount", "interconnect", and "connect" should be understood in a broad sense. For example, such terms may indicate a fixed connection, a detachable connection, or an integral connection; may indicate a mechanical connection or an electrical connection; and may indicate direct interconnection, indirect interconnection through an intermediate medium, or internal communications between two elements. A person of ordinary skill in the art may understand specific meanings of the foregoing terms in this application based on a specific situation.

Opposite disposition: may be understood as a face-to-face arrangement or at least some areas partially overlapping in a specific direction. In an embodiment, two radiators disposed opposite to each other are disposed adjacent to each other, and no other radiator is disposed between the two radiators.

Coupling: may be understood as a direct coupling and/or an indirect coupling, and a "coupling connection" may be understood as a direct coupling connection and/or an indirect coupling connection. The direct coupling may also be referred to as an "electrical connection", which may be understood as physical contact and electrical conductivity of components; or may be understood as a form in which different components in a line structure are connected by using a physical line that can transmit an electrical signal, like printed circuit board (PCB) copper foil or a conducting wire. The "indirect coupling" may be understood as electrical conductivity of two conductors through space or a non-contact manner. In an embodiment, the indirect coupling may also be referred to as a capacitive coupling. For example, signal transmission is implemented by forming equivalent capacitance through coupling of a gap between two conductive elements.

The coupling in this application may include an electrical coupling, namely, a capacitive coupling. For example, signal transmission is implemented by forming equivalent capacitance through coupling of a gap between two conductive elements. The coupling may further include a magnetic coupling, namely, an electromagnetic coupling. The electromagnetic coupling is also referred to as a mutual inductance coupling, which means mutual inductance between two circuits enables a current change of one circuit affects another circuit through mutual inductance. Inputs and outputs of two or more circuit elements or electrical networks closely cooperate with each other and affect each other, and signal transmission is implemented through interaction.

Ground/floor: may generally mean at least a part of any ground layer, or ground plane, or ground metal layer of an electronic device (for example, a mobile phone), or at least a part of any combination of the any ground layer, ground plane, ground component, or the like. The "ground/floor" may be configured to ground a component of the electronic device. In an embodiment, the "ground/floor" may be a ground layer of a circuit board of the electronic device, or may be a ground plane formed by a middle frame of the electronic device, or a ground metal layer formed by a metal film below a display of the electronic device. In an embodiment, a circuit board may be a printed circuit board (printed circuit board, PCB), for example, an 8-layer board, a 10-layer board, or 12-layer to 14-layer boards respectively having 8, 10, 12, 13, or 14 layers of conductive material, or an element that is separated and electrically insulated by a dielectric layer or an insulation layer like glass fiber, polymer, or the like. In an embodiment, a circuit board includes a dielectric substrate, a ground layer, and a trace layer, where the trace layer and the ground layer may be electrically connected through a via hole. In an embodiment, components such as a display, a touchscreen, an input button, a transmitter, a processor, a memory, a battery, a charging circuit, and a system on chip (system on chip, SoC) structure may be mounted on or connected to a circuit board, or electrically connected to a trace layer and/or a ground layer in the circuit board. For example, a radio frequency source is disposed at the trace layer.

Any of the foregoing ground layers, or ground planes, or ground metal layers is made of conductive materials. In an embodiment, the conductive material may be any one of the following materials: copper, aluminum, stainless steel, brass and alloys thereof, copper foil on insulation laminates, aluminum foil on insulation laminates, gold foil on insulation laminates, silver-plated copper, silver-plated copper foil on insulation laminates, silver foil on insulation laminates and tin-plated copper, cloth impregnated with graphite powder, graphite-coated laminates, copper-plated laminates, brass-plated laminates and aluminum-plated laminates. A person skilled in the art may understand that the ground layer/ground plane/ground metal layer may alternatively be made of other conductive materials.

An electrical length may be indicated by multiplying a physical length (that is a mechanical length or a geometric length) and a ratio of a transmission period of an electrical or electromagnetic signal in a medium to a period required when the signal passes through the same distance as a physical length of the medium in free space. The electrical length may meet the following formula:

$$\bar{L} = L \times \frac{a}{b}.$$

L is the physical length, and a is the transmission period of the electrical or electromagnetic signal in the medium, and b is the transmission period in the free space.

Alternatively, the electrical length may be a ratio of the physical length (that is, the mechanical length or the geometric length) to a wavelength of a transmitted electromagnetic wave. The electrical length may meet the following formula:

$$\bar{L} = \frac{L}{\lambda}.$$

L is the physical length, and λ is the wavelength of the electromagnetic wave.

Limitations such as collinearity, coaxiality, coplanarity, symmetry (for example, axisymmetricity or centrosymmetry), parallelism, perpendicularity, and sameness (for example, a same length and a same width) mentioned in embodiments of this application are all for a current technology level, but are not absolutely strict definitions in a mathematical sense. A deviation less than a preset threshold (for example, 1 mm, 0.5 m, or 0.1 mm) may exist between edges of two collinear radiation nodes or two collinear antenna elements in a line width direction. A deviation less than a preset threshold (for example, 1 mm, 0.5 m, or 0.1 mm) may exist between edges of two coplanar radiation nodes or two coplanar antenna elements in a direction perpendicular to a coplanar plane of the two radiation nodes or the two antenna elements. A deviation of a preset angle (for example, ±5°, ±10°) may exist between two antenna elements that are parallel or perpendicular to each other.

To make the objectives, technical solutions, and advantages of this application clearer, the following further describes the implementations of this application in detail with reference to the accompanying drawings.

The technical solutions provided in this application are applicable to an electronic device that has one or more of the following communications technologies: a Bluetooth (Bluetooth, BT) communications technology, a global positioning system (global positioning system, GPS) communications technology, a wireless fidelity (wireless fidelity, Wi-Fi) communications technology, a global system for mobile communications (global system for mobile communications, GSM) technology, a wideband code division multiple access (wideband code division multiple access, WCDMA) communications technology, a long term evolution (long term evolution, LTE) communications technology, a 5G communications technology, a SUB-6G communications technology, another future communications technology, and the like. An electronic device in embodiments of this application may be a mobile phone, a tablet computer, a notebook computer, a smart home, a smart band, a smart watch, a smart helmet, smart glasses, a device (for example, an automotive shark fin) in an in-vehicle antenna system, or the like. Alternatively, the electronic device may be a handheld device, computing device, another processing device connected to a wireless modem, or a vehicle-mounted device that has a wireless communication function, an electronic device in a 5G network, or an electronic device in a future evolved public land mobile network (public land mobile network, PLMN), a wireless router, customer premises equipment (customer premises equipment, CPE), or the like. This is not limited in embodiments of this application.

Figure 2A:
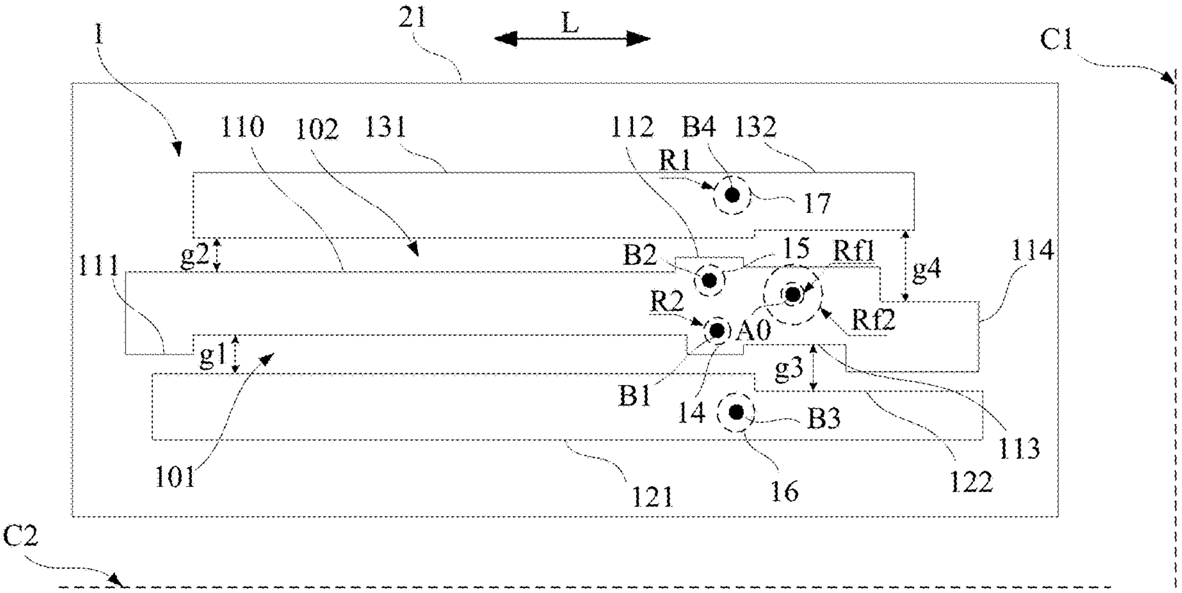
FIG. 2*a* is a schematic top view of a structure of an antenna according to an embodiment of this application.
Figure 2B:
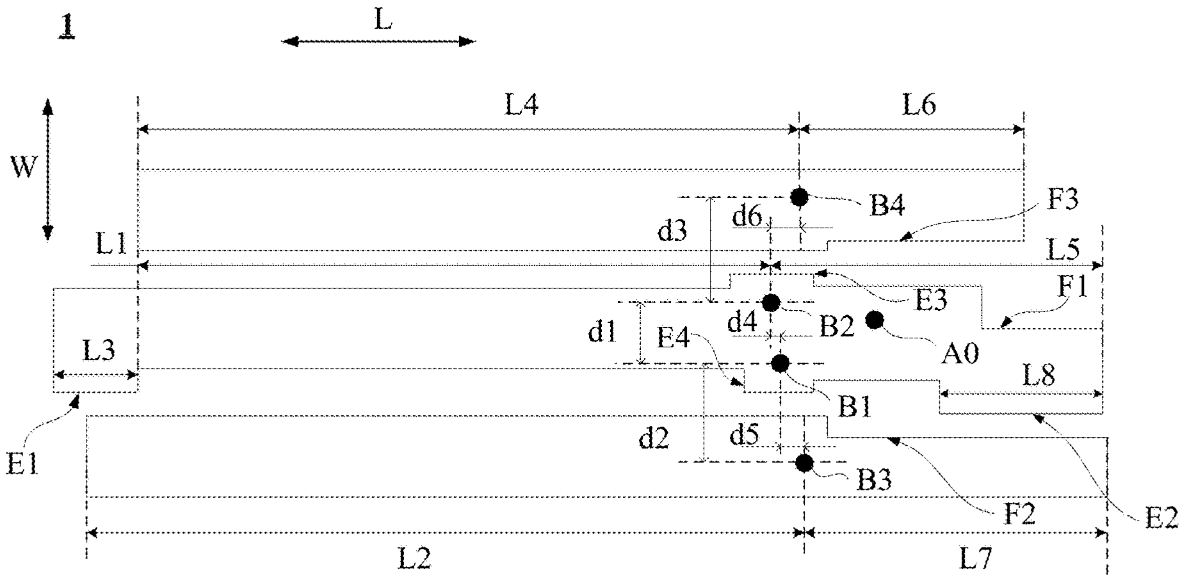
FIG. 2*b* is a partial enlarged top view of a structure of an antenna according to an embodiment of this application.

Refer to FIG. 1 to FIG. 2*b*. FIG. 1 is a schematic diagram of a three-dimensional structure of an antenna according to an embodiment of this application. FIG. 2*a* is a schematic top view of a structure of an antenna according to an embodiment of this application. FIG. 2*b* is a partial enlarged top view of a structure of an antenna according to an embodiment of this application.

As shown in FIG. 1, an antenna 1 provided in this application includes a feeding element 18 and a plurality of radiators. The plurality of radiators include a first radiator 11, a second radiator 12, and a third radiator 13 that are spaced from each other side by side in a first direction W on a same plane (for example, a coplanar plane). The first radiator 11, the second radiator 12, and the third radiator 13 are all spaced from the ground and disposed opposite to the ground in a second direction H.

Refer to FIG. 1 and FIG. 2*a*. One end of the feeding element 18 is connected to a feeding connection point A0 of the first radiator 11, and the other end is connected to a feeding point (not shown in the figure). The feeding point may be understood as one signal output end of a radio frequency source, for example, may be an output pin of a radio frequency chip, or may be an output end of a signal transmission line configured to connect to the radio frequency source. Provided the radio frequency source is electrically connected and a radio frequency signal is received through the feeding point, it is considered as not departing from the scope of this embodiment.

In the first direction W, the second radiator 12 and the third radiator 13 are respectively located on two sides of the first radiator 11, a first gap 101 is formed between the second radiator 12 and the first radiator 11, and a second gap 102 is formed between the third radiator 13 and the first radiator 11.

The first radiator 11 and the second radiator 12 can be electrically coupled through the first gap 101 to transmit energy. The first radiator 11 and the third radiator can be electrically coupled through the second gap 102 to transmit energy.

The antenna further includes a first ground element 14, a second ground element 15, a third ground element 16, and a fourth ground element 17 that are spaced from each other in the first direction W. One end of the first ground element 14 is connected to a first ground point B1 of the first radiator 11, and the other end is grounded (for example, a PCB 20). One end of the second ground element 15 is connected to a second ground point B2 of the first radiator 11, and the other end is grounded. Both the first ground element 14 and the second ground element 15 are spaced from each other from the feeding element 18 in a third direction L.

One end of the third ground element 16 is connected to a ground point B3 of the second radiator 12, and the other end is grounded. One end of the fourth ground element 17 is connected to a ground point B4 of the third radiator 13, and the other end is grounded.

The first direction W, the second direction H, and the third direction L are perpendicular to each other, the first direction W is parallel to a width direction of the first radiator 11, and the third direction Lis parallel to a length direction of the first radiator 11.

A structure in which the first radiator 11 is connected to the feeding point A0 by using the feeding element 18 and is grounded by using the first ground element 14 and the second ground element 15 may be understood as a structure similar to a planar inverted F-shaped antenna (or may be referred to as a PIFA antenna, Plannar Inverted F-shaped Antenna).

In an implementation, the feeding element 18, the first ground element 14, the second ground element 15, the third ground element 16, and the fourth ground element 17 are all disposed in an extended manner in the second direction H. The feeding element 18 may be a metal rod or a hollow metal rod formed through a metal via hole in a bracket 21 (the bracket 21 may be a dielectric block). Each of the first ground element 14, the second ground element 15, the third ground element 16, and the fourth ground element 17 may be a metal rod or a hollow metal rod formed through a metal via hole in the bracket 21.

In an implementation, the ground may be formed by a ground metal layer on the PCB 20, and the first ground element 14, the second ground element 15, the third ground element 16, and the fourth ground element 17 are connected to the ground metal layer on the PCB 20 through the metal via holes. In another implementation, the ground may alternatively be formed by a metal plate of the electronic device.

The second direction H may be understood as a direction parallel to a thickness of the first radiator 11. Therefore, the feeding element 18, the first ground element 14, the second ground element 15, and the third ground element 16 may be understood as being disposed perpendicular to corresponding radiators.

In an implementation, a cross section of the feeding element 18, a cross section of the first ground element 14, a cross section of the second ground element 15, a cross section of the third ground element 16, and a cross section of the fourth ground element 17 are all in a circular shape. Sizes of the cross sections of the feeding element 18 and the ground elements are not limited. In an implementation, refer to FIG. 2*a*. A cross-sectional radius R1 of the first ground element 14 may be 0.35 mm, a cross-sectional radius R2 of the fourth ground element 17 may be 0.25 mm, an inner wall radius Rf1 of the feeding element 18 (the hollow metal rod) may be 0.25 mm, and an outer wall radius Rf2 may be 0.5 mm. In another alternative implementation, other sizes are possible.

In another alternative implementation, the cross sections of the feeding element 18 and the ground elements may be all in a rectangular shape, or some of the cross sections are in a circular shape, and the rest are in a rectangular shape, or the cross sections may be in another shape. This is not limited in this application.

The first ground element 14, the second ground element 15, the third ground element 16, and the fourth ground element 17 may be disposed in a staggered manner or may be aligned in the third direction L.

In an implementation, at least some of the first ground element 14, the second ground element 15, the third ground element 16, and the fourth ground element 17 are disposed in a staggered manner in the third direction L. In an example, the first ground element 14 and the second ground element 16 are aligned in the third direction L, the third ground element 16 and the fourth ground element 17 are aligned in the third direction L, and the first ground element 14 and the third ground element 16 are disposed in a staggered manner in the third direction L. In another example, the four ground elements may alternatively be disposed in a staggered manner in the third direction L.

In addition, an antenna height in this embodiment of this application is not limited. The antenna height h0 may be understood as a distance between the ground and an upper surface of a radiator that is farthest from a floor. In an implementation, the antenna height h0 is as follows: 4 mm≤h0≤6 mm. For example, the antenna height h0 may be 5 mm.

After the antenna is connected to the radio frequency source, a current distributed in a sine-cosine manner can be excited on the first radiator 11, the second radiator 12, and the third radiator 13. Because the first radiator 11, the second radiator 12, and the third radiator 13 are all disposed perpendicular to the corresponding radiators, the changing current on the radiator is capable of generating corresponding magnetic fields around the feeding element 18, the first ground element 14, the second ground element 15, the third ground element 16, and the fourth ground element 17. In this case, a hybrid coupling of an electrical coupling and a magnetic coupling between the radiators is generated.

It can be learned that, in this embodiment of this application, the first radiator 11, the second radiator 12, and the third radiator 13 are spaced from each other side by side, and first ground 14, the second ground element 15, the third ground element 16, the fourth ground element 17, and the feeding element 18 are connected to corresponding radiators, to form a new antenna structure. In this way, a hybrid coupling of an electrical coupling and a magnetic coupling can be simultaneously formed between the radiators, generating a third-order Chebyshev bandpass filtering response. This helps ensure that the antenna is capable of generating two radiation nulls (or may be understood as points with extremely low antenna efficiency) outside an operating frequency band by changing a proportion of the electrical coupling and the magnetic coupling in a total coupling through the first gap and the second gap under a condition that a total coupling strength of the antenna remains unchanged. This implements a filtering function without changing a radiation characteristic of the antenna, helps improve isolation between different-frequency antennas of the electronic device, and lays a foundation for improving an anti-interference capability of the electronic device.

In addition, the antenna in this embodiment of this application has features such as a simple feeding structure, a compact antenna structure, and a small size. This may contribute to miniaturization, lightness and thinness of the electronic device when the antenna is used in the electronic device.

In an implementation, the first gap 101 enables an electrical coupling strength between the first radiator 11 and the second radiator 12 to be a first target strength at a first target frequency point, and the second gap 102 enables an electrical coupling strength between the first radiator 11 and the third radiator 13 to be a second target strength at a second target frequency point. In this case, the antenna is capable of generating two radiation nulls at the first target frequency point and the second target frequency point.

An operating frequency band of the antenna is between the first target frequency point and the second target frequency point.

It should be noted that the antenna in this embodiment of this application may be a single-band antenna, or may be a multi-band antenna, for example, a dual-band antenna. In other words, there may be one or more operating frequency bands of the antenna. This is not limited in this application.

The first target frequency point may be understood as one frequency point at an upper edge of a passband, or may be understood as one frequency point less than a lower limit frequency point of the operating frequency band of the antenna. The second target frequency point may be understood as one frequency point at a lower edge of the passband, or may be understood as one frequency point greater than an upper limit frequency point of the operating frequency band of the antenna. (For details, refer to the following description related to FIG. 4 for understanding.) In this implementation of this application, both the first target strength and the second target strength may be understood as an extremely low electrical coupling strength. The antenna has extremely poor antenna efficiency under the coupling strength, and cannot operate normally. Specific values of the first target strength and the second target strength may be the same, or may be different.

The antenna in this embodiment of this application can simultaneously form the hybrid coupling of the electrical coupling and the magnetic coupling on each radiator when connecting to a radio frequency source. Therefore, the electrical coupling strength between the first radiator 11 and the second radiator 12 and the electrical coupling strength between the first radiator 11 and the third radiator 13 may be adjusted by appropriately setting sizes of the first gap 101 and the second gap 102. One point whose electrical coupling strength is the first target strength, that is, the electrical coupling strength is extremely low is formed at one frequency point (namely, the first target frequency point) at an upper edge of a current operating frequency band of the antenna. One point whose electrical coupling strength is the second target strength, that is, the electrical coupling strength is extremely low is formed at one frequency point (namely, the second target frequency point) at a lower edge of the current operating frequency band of the antenna. In addition, the feeding element 18, the first ground element 14, the second ground element 15, the third ground element 16, and the fourth ground element 17 generate corresponding magnetic fields, so that a hybrid coupling of an electrical coupling and a magnetic coupling is generated between the radiators. This can ensure that a total coupling strength between the radiators (for example, the first radiator 11, the second radiator 12, and the third radiator 13) remains unchanged, and a radiation characteristic of the antenna is not affected.

It can be learned that, in this embodiment of this application, the first gap 101 and the second gap 102 enable one radiation null (or may be understood as a point with extremely low antenna efficiency) to be generated at each of the two target frequencies under a condition that the total coupling strength of the antenna remains unchanged. When a frequency of a radio frequency signal received by the antenna is at a frequency point of the radiation null or is at a frequency point outside the operating frequency band of the antenna, the antenna has extremely low efficiency and cannot operate normally. In this embodiment of this application, the operating frequency band of the antenna is between the two target frequencies. Therefore, in this embodiment of this application, antenna efficiency is relatively high in the operating frequency band of the antenna, and the antenna efficiency is relatively low outside the operating frequency band of the antenna. Alternatively, it may be understood that the antenna in this embodiment of this application can receive a radio frequency signal in the operating frequency band, and suppress a radio frequency signal outside the operating frequency band. Therefore, the antenna efficiency shows relatively high edge selectivity. This implements a filtering function, helps improve isolation between different-frequency antennas of the electronic device, and further improves an anti-interference capability of the electronic device.

The radiator is not limited in a shape, and may be in a triangle shape, a square ring shape, a circular ring shape, a sector shape, or the like. In an implementation, as shown in FIG. 1 to FIG. 2*b*, the first radiator 11, the second radiator 12, and the third radiator 13 are all in a strip shape.

Refer to FIG. 2*b*. In an implementation, at least one widened portion and/or at least one narrowed portion are disposed on each of the first radiator 11, the second radiator 12, and the third radiator 13. In an implementation, widened portions (for example, a widened portion E1 and a widened portion E2) are disposed on two sides that are of a first end and a second end of the first radiator 11 and that are close to the second radiator 12.

In an implementation, a narrowed portion F1 is disposed on one side that is of the second end of the first radiator 11 and that is close to the third radiator 13. In an implementation, widened portions (for example, a widened portion E3 and a widened portion E4) are disposed on two sides of a radiator section in which the first ground point B1 and the second ground point B2 of the first radiator 11 are located. In an implementation, a narrowed portion F2 is disposed on the second radiator 12, on one side of the ground point B3 of the second radiator, and on one side that is of a radiator section close to the feeding point A0 and that is close to the first radiator 11. In an implementation, a narrowed portion F3 is disposed on the third radiator 13, on one side of the ground point B4 of the third radiator, and on one side that is of a radiator section close to the feeding point A0 and that is close to the first radiator 11.

In an implementation, refer to FIG. 1 and FIG. 2*a*. The first radiator 11 includes a first radiator section 111, a primary radiator section 110, a second radiator section 112, a third radiator section 113, and a fourth radiator section 114 that are sequentially connected in the length direction (parallel to the third direction L) of the first radiator 11. The first ground point B1 and the second ground point B2 are disposed on the second radiator section 112, and the feeding connection point A0 is disposed on the third radiator section 113.

A plane parallel to a cross section of the first radiator 11 is used as a first projection plane C1. A projection of the primary radiator section 110 on the first projection plane C1 is located in a projection of the second radiator section 112 on the first projection plane C1. A projection of the third radiator section 113 on the first projection plane C1 covers the projection of the primary radiator section 110 on the first projection plane C1, and is located in the projection of the second radiator section 112 on the first projection plane C1. A projection of the first radiator section 111 on the first projection plane C1 covers the projection of the primary radiator section 110 on the first projection plane C1, and is located in the projection of the second radiator section 112 on the first projection plane C1. A part of a projection of the fourth radiator section 114 on the first projection plane C1 is located in the projection of the primary radiator section 110 on the first projection plane C1, and a remaining part is located outside the projection of the primary radiator section 110 on the first projection plane C1. In an implementation, a center line of the primary radiator section 110, a center line of the second radiator section 112, and a center line of the third radiator section 113 overlap. Both a center line of the first radiator section 111 and a center line of the fourth radiator section 114 are located between the center line of the primary radiator section 110 and the second radiator 12.

In another alternative implementation, the center line of the primary radiator section 110, the center line of the second radiator section 112, and the center line of the third radiator section 113 may not overlap. For example, the center line of the second radiator section 112 may offset, relative to the center line of the primary radiator section 110, in a direction toward the second radiator 12, or in a direction away from the second radiator 12. The center line of the first radiator section 111 and the center line of the fourth radiator section 114 may alternatively be located between the center line of the primary radiator section 110 and the third radiator 13, or may overlap the center line of the primary radiator section 110. Specifically, design adjustment may be performed based on a length of the radiator and the operating frequency band of the antenna. This is not limited in this application. Provided that a shape of the first radiator 11 enables the first gap 101 to meet a coupling strength requirement of the first radiator 11 and the second radiator 12 and a coupling strength requirement of the first radiator 11 and the third radiator 13, it is considered as not departing from the scope of this embodiment of this application.

The second radiator 12 includes a primary radiator section 121 and a secondary radiator section 122 that are sequentially connected in a length direction of the second radiator 12. The ground point B3 of the second radiator 12 is disposed on the primary radiator section 121 of the second radiator 12. In an implementation, the ground point B3 of the second radiator is disposed on a radiator section that is in the primary radiator section 121 of the second radiator 12 and that is close to the secondary radiator section 122 of the second radiator 12. The ground point B4 of the third radiator is disposed on a radiator section that is in the primary radiator section 131 of the third radiator 13 and that is close to a secondary radiator section 132 of the third radiator 13.

In an implementation, a projection of the secondary radiator section 122 of the second radiator 12 on the first projection plane C1 is located in a projection of the primary radiator section 121 of the second radiator 12 on the first projection plane C1. A center line of the secondary radiator section 122 of the second radiator 12 is located on one side that is of a center line the primary radiator section 121 of the second radiator 12 and that is away from the first radiator 11. In another alternative implementation, the center line of the secondary radiator section 122 may alternatively be located on one side that is of the primary radiator section 121 and that is close to the first radiator 11, or may overlap the center line of the primary radiator section 121. Specifically, design adjustment may be performed based on a length of the radiator and the operating frequency band of the antenna. This is not limited in this application. Provided that a shape of the second radiator 12 enables the first gap 101 to meet a coupling strength requirement of the first radiator 11 and the second radiator 12, it is considered as not departing from the scope of this embodiment of this application.

The third radiator 13 includes a primary radiator section 131 and a secondary radiator section 132 that are sequentially connected in a length direction of the third radiator 13. The ground point B4 of the third radiator is disposed on the primary radiator section 131 of the third radiator 13.

A projection of the secondary radiator section 132 of the third radiator 13 on the first projection plane C1 is located in a projection of the primary radiator section 131 of the third radiator 13 on the first projection plane C1. A center line of the secondary radiator section 132 of the third radiator 13 is located on one side that is of a center line of the primary radiator section 131 of the third radiator 13 and that is away from the first radiator 11. In another alternative implementation, the center line of the secondary radiator section 132 may alternatively be located on one side that is of the primary radiator section 131 and that is close to the first radiator 11, or may overlap the center line of the primary radiator section 131. Specifically, design adjustment may be performed based on a length of the radiator and the operating frequency band of the antenna. This is not limited in this application. Provided that a shape of the third radiator 13 enables the second gap 102 to meet a coupling strength requirement of the first radiator 11 and the third radiator 13, it is considered as not departing from the scope of this embodiment of this application.

In an implementation, in the third direction L, both ends of the second radiator 12 are located between two ends of the first radiator 11, and both ends of the third radiator 13 are located between two ends of the second radiator 12.

A person skilled in the art should understand that the "end" of the radiation element mentioned in this specification is not limited to a specific end face of the radiator, but may further be a partial area of the radiator including the end surface, for example, an area within 5 mm or 2 mm of the end face of the radiator.

In an implementation, a plane parallel to a longitudinal section of the first radiator 11 is used as a second projection plane C2. A projection of the primary radiator section 131 of the third radiator 13 on the second projection plane C2 is located in a projection of the primary radiator section 121 of the second radiator 12 on the second projection plane C2. A projection of the secondary radiator section 132 of the third radiator 13 on the second projection plane C2 is located in a projection of the secondary radiator section 122 of the second radiator 12 on the second projection plane C2. A projection of the first radiator section 111 of the first radiator 11 on the second projection plane C2 is located outside a projection of the primary radiator section 131 of the third radiator 13 on the second projection plane C2. A part of a projection of the fourth radiator section 114 on the second projection plane C2 is located in the projection of the secondary radiator 132 of the third radiator 13 on the second projection plane C2, and a remaining part is located outside the projection of the secondary radiator 132 of the third radiator 13 on the second projection plane C2.

In an implementation, projections of the primary radiator section 110 and the second radiator section 112 of the first radiator 11 on the second projection plane C2 are located in the projection of the primary radiator section 131 of the third radiator 13 on the second projection plane C2.

In this application, with the foregoing structure, the first gap 101 and the second gap 102 that are in irregular shapes are shown in FIG. 1 and FIG. 2*a*. Alternatively, this may be understood as: A width of the first gap 101 is uneven, and a width of the second gap 102 is also uneven. The width of the gap may be understood as a size of the gap in the first direction W. Therefore, the electrical coupling strengths between the radiators corresponding to the two gaps are adjusted through the first gap 101 and the second gap 102 whose widths are uneven, and the two radiation nulls (or may be understood as the points with extremely low antenna efficiency) are generated outside the operating frequency band of the antenna. A person skilled in the art may understand that, in this application, a quantity of radiators is not limited, and there may be three or more radiators. The first gap 101 and the second gap 102 may not be limited to the shapes in FIG. 1 and FIG. 2*a*. The shapes and location relationships of the first radiator 11, the second radiator 12, and the third radiator 13 are not limited to the foregoing structure, provided that corresponding two or more radiation nulls are generated outside the operating frequency band of the antenna by using the plurality of radiators (for example, the first radiator 11, the second radiator 12, and the third radiator 13), the gaps (for example, the first gap 101 and the second gap 102) between the plurality of radiators, and the feeding element 18, the first ground element 14, the second ground element 15, the third ground element 16, and the fourth ground element 17 that are perpendicular to the radiators and that are disposed on the corresponding radiators, it is considered as not departing from the scope of this embodiment of this application.

In an implementation, each of the plurality of radiators is capable of generating at least two resonances, and resonance frequency points corresponding to the at least two resonances generated by each radiator are in different operating frequency bands of the antenna. The corresponding resonance frequency point may be understood as a resonance frequency point at which the radiator is capable of generating a corresponding resonance. In an implementation, a first resonance frequency point of each of the plurality of radiators is in a first operating frequency band of the antenna. In an implementation, a second resonance frequency point of each of the plurality of radiators is in a second operating frequency band of the antenna.

For example, in an implementation, each of the plurality of radiators of the antenna is capable of generating two resonances, or it may be understood that the antenna is a dual-band antenna. For a specific structure, refer to FIG. 2*a*. In the third direction L, in the first radiator 11, an electrical length of a radiator section located on one side of the feeding connection point A0 is ¼ of an operating wavelength corresponding to the first resonance frequency point of the first radiator 11; and an electrical length of a radiator section located on the other side of the feeding connection point A0 is ¼ of an operating wavelength corresponding to the second resonance frequency point of the first radiator.

In the third direction L, in the second radiator 12, an electrical length of a radiator section located on one side of the ground point B3 of the second radiator 12 is ¼ of an operating wavelength corresponding to the first resonance frequency point of the second radiator 12; and an electrical length of a radiator section located on the other side of the ground point B3 of the second radiator 12 is ¼ of an operating wavelength corresponding to the second resonance frequency point of the second radiator 12.

In the third direction L, in the third radiator 13, an electrical length of a radiator section located on one side of the ground point B4 of the third radiator is 13¼ of an operating wavelength corresponding to the first resonance frequency point of the third radiator 13; and an electrical length of a radiator section located on the other side of the ground point B4 of the third radiator 13 is ¼ of an operating wavelength corresponding to the second resonance frequency point of the third radiator 13.

It should be understood that, in this embodiment of this application, a physical length of the radiator may be (1±10%) times longer an electrical length of the radiator. For example, a physical length of a radiator section located in the first radiator 11 on one side of the feeding connection point A0 may be (1±10%) times longer ¼ of the operating wavelength corresponding to the first resonance frequency point of the first radiator 11.

The first resonance frequency point of the first radiator 11, the first resonance frequency point of the second radiator 12, and the first resonance frequency point of the third radiator 13 are all in the first operating frequency band of the antenna.

The second resonance frequency point of the first radiator 11, the second resonance frequency point of the second radiator 12, and the second resonance frequency point of the third radiator 13 are all in the second operating frequency band of the antenna. The second operating frequency band and the first operating frequency band are different operating frequency bands, and the frequency bands do not overlap. In an implementation, the antenna is a dual-band Wi-Fi antenna, the first operating frequency band of the antenna is 2.4 GHz to 2.52 GHZ, and is applicable to a Wi-Fi 2.4 GHz frequency band, and the second operating frequency band of the antenna is 5 GHz to 5.88 GHz, and is applicable to a Wi-Fi 5 GHz frequency band.

In addition, positions of the feeding connection point A0 and a plurality of ground points are not limited. In an implementation, the feeding connection point A0 is located at ⅓ of the first radiator 11 in the length direction of the first radiator 11.

The first ground point B1 and the second ground point B2 may also be located at ⅓ of the first radiator 11 in the length direction of the first radiator 11 (in this case, the feeding connection point A0 is not located at ⅓ of the first radiator 11 in the length direction of the first radiator 11, and is spaced from the first ground point B1 and the second ground point B2 in the length direction of the first radiator 11).

In an implementation, in the third direction L, the first ground point B1, the second ground point B2, the ground point B3 of the second radiator, and the ground point B4 of the third radiator are all located on a same side of the feeding connection point A0. For example, the first ground point B1, the second ground point B2, the ground point B3 of the second radiator, and the ground point B4 of the third radiator are all located on one side that is of the feeding connection point A0 and that is close to the primary radiator section 110, or may be located on one side that is of the feeding connection point A0 and that is away from the primary radiator section 110. In another example, some of the first ground point B1, the second ground point B2, the ground point B3 of the second radiator, and the ground point B4 of the third radiator may alternatively be located on one side of the feeding connection point A0, and others are located on the other side of the feeding connection point A0.

In an implementation, FIG. 2*b* is a partial enlarged top view of a structure of an antenna according to an embodiment of this application. In the first direction W, the first ground point B1 is located between the second ground point B2 and the ground point B3 of the second radiator, and a spacing d1 between the first ground point B1 and the second ground point B2, a spacing d2 between the first ground point B1 and the ground point B3 of the second radiator, and a spacing d3 between the second ground point B2 and the ground point B4 of the third radiator are all less than or equal to 10 mm.

In an implementation, in the first direction W, the spacing d1 between the first ground point B1 and the second ground point B2 is 0.4 mm≤d1≤4.4 mm, for example, 1.4 mm, 1.5 mm, or 2.5 mm. The spacing d2 between the first ground point B1 and the ground point B3 of the second radiator is 0.6 mm≤d2≤4.6 mm, for example, 1.6 mm, 1.7 mm, or 2.7 mm. The spacing d3 between the second ground point B2 and the ground point B4 of the third radiator is 0.5 mm≤d3≤4.5 mm, for example, 1.5 mm, 1.6 mm, or 2.5 mm. In another alternative implementation, another value may exist.

In an implementation, in the third direction L, a spacing d4 between the first ground point B1 and the second ground point B2, a spacing d5 between the ground point B3 of the second radiator and the first ground point B1, and a spacing d6 between the ground point B4 of the third radiator and the second ground point B2 are all less than or equal to 10 mm.

In an implementation, in the third direction L, the spacing d4 between the first ground point B1 and the second ground point B2 is 0.4 mm≤d4≤4.4 mm, for example, 1.4 mm, 1.5 mm, or 2.5 mm. The spacing d5 between the first ground point B1 and the ground point B3 of the second radiator is 0.6 mm≤d5≤4.6 mm, for example, 1.6 mm, 1.7 mm, or 2.7 mm. The spacing d6 between the second ground point B2 and the ground point B4 of the third radiator is 0.5 mm≤d6≤4.5 mm, for example, 1.5 mm, 1.6 mm, or 2.5 mm. In another alternative implementation, another value may exist.

This embodiment of this application provides antenna parameter selection reference values that can meet use requirements of specific operating frequency bands. For details, refer to Table 1 (with reference to FIG. 2*a* and FIG. 2*b*).

TABLE 1

| Parameter | Value |
|---|---|
| radiator section L1 (mm) of a third radiator 11 | 15.8 |
| radiator section L3 (mm) of the first radiator 11 | 2 |
| radiator section L5 (mm) of the first radiator 11 | 7 |
| radiator section L8 (mm) of a first radiator 11 | 3 |
| radiator section L2 (mm) of a second radiator 12 | 14.6 |
| radiator section L7 (mm) of the second radiator 12 | 4.7 |
| radiator section L4 (mm) of a third radiator 13 | 13.4 |
| radiator section L6 (mm) of the third radiator 13 | 6.4 |
| Spacing d1 (mm) | 1.4 |
| Spacing d2 (mm) | 1.6 |
| Spacing d3 (mm) | 1.5 |
| Cross-sectional radius R1 (mm) of a fourth ground element 17 | 0.25 |
| Cross-sectional radius R2 (mm) of a first ground element 14 | 0.35 |
| Inner wall radius Rf1 (mm) of a feeding element 18 | 0.25 |
| Outer wall radius Rf2 (mm) of the feeding element 18 | 0.5 |
| Width (mm) of a gap section g1 of a first gap 101 | 1 |
| Width (mm) of a gap section g3 of the first gap 101 | 1.2 |

TABLE 1-continued

| Parameter | Value |
|---|---|
| Width (mm) of a gap section g2 of a second gap 102 | 0.8 |
| Width (mm) of a gap section g4 of the second gap 102 | 0.95 |
| Operating frequency band of an antenna | First operating frequency band: 2.4 GHz to 2.52 GHz<br>Second operating frequency band: 5 GHz to 5.88 GHz |

It should be noted that the foregoing is merely an example of parameter selection of a dual-band Wi-Fi antenna. When the antenna in this embodiment of this application is used as another antenna or is applicable to another operating frequency band, parameter selection may be adjusted based on an actual application scenario of the antenna. This is not limited in this application.

In this implementation, a longer radiator section located in the first radiator 11 on one side of the feeding connection point A0 (namely, a radiator section located in the first radiator 11 on a left side of the feeding connection point A0 shown in FIG. 2*a*), a longer radiator section located in the second radiator 12 on one side of the ground point B3 (namely, a radiator section located in the second radiator 12 on the left side of the feeding connection point A0 shown in FIG. 2*a*), and a longer radiator section located in the third radiator 13 on one side of the ground point B4 (namely, a radiator section located in the third radiator 13 on the left side of the feeding connection point A0 in FIG. 2*a*) simultaneously operate on the first operating frequency band of the antenna, namely 2.4 GHz to 2.52 GHz. Therefore, the foregoing structure may be understood as low frequency parts of the three radiators.

A shorter radiator section located in the first radiator 11 on the other side of the feeding connection point A0 (namely, a radiator section located in the first radiator 11 on a right side of the feeding connection point A0 shown in FIG. 2*a*), a shorter radiator section located in the second radiator 12 on the other side of the ground point B3 (namely, a radiator section located in the second radiator 12 on the right side of the feeding connection point A0 shown in FIG. 2*a*), and a shorter radiator section located in the third radiator 13 on the other side of the ground point B4 (namely, a radiator section located in the third radiator 13 on the right side of the feeding connection point A0 in FIG. 2*a*) simultaneously operate on the second operating frequency band of the antenna, namely 5 GHz to 5.88 GHz. Therefore, the foregoing structure may be understood as high frequency parts of the three radiators.

Figure 3:
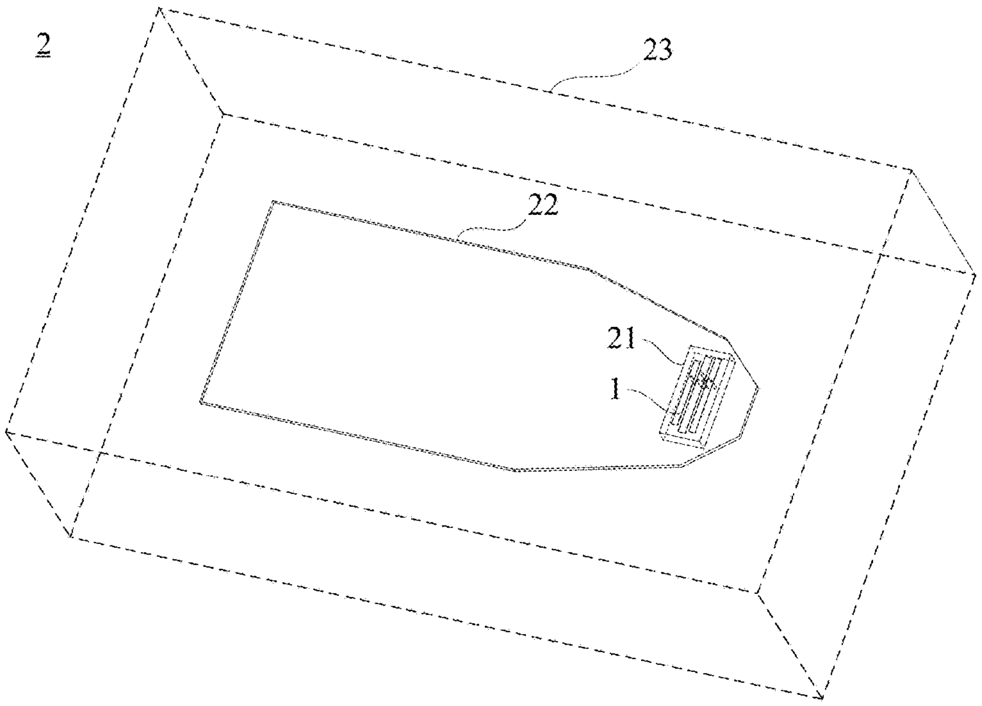
FIG. 3 is a schematic diagram of a three-dimensional structure of an antenna of an electronic device according to an embodiment of this application.

FIG. 3 is a schematic diagram of a three-dimensional structure of an antenna of an electronic device according to an embodiment of this application.

As shown in FIG. 3, an embodiment of this application further provides the electronic device 2, including the antenna 1 in any one of the foregoing implementations. The electronic device further includes a housing 23, and both a bracket 21 and a shark fin floor 22 that are disposed in the housing 23. The antenna is supported and fastened in the electronic device 2 by using the bracket 21. The shark fin floor 22 is used as the ground, and may be formed by a PCB, or may be formed by a grounded metal plate.

In an implementation, the bracket 21 is fastened to the shark fin floor 22. The bracket 21 may be formed by a dielectric plate and used as a support structure of the antenna 1. A dielectric constant and a size of the bracket 21 affect performance of the antenna. The dielectric plate may be, for example, a substrate based on a low-temperature co-fired ceramic (LTCC, "Low Temperature Co-fired Ceramic") process (for example, the substrate may be made of a Ferro A6m material provided by Ferro, where a dielectric constant is 5.9, and a dielectric thickness of each layer is 0.094 mm). In an implementation, the bracket 21 may alternatively be a substrate formed through another process, for example, a substrate formed through a PCB process, and an HDI (High Density Interconnector, a high-density interconnect technology, such as a micro, blind and buried via hole technology) process.

In an implementation, the antenna 1 in this embodiment of this application may be used as a Wi-Fi antenna of the electronic device 2. It should be understood that the Wi-Fi antenna is an antenna configured to transmit and receive a wireless signal, so that the electronic device is connected to a wireless local area network (WLAN, Wireless Local Area Network). In an implementation, the antenna 1 is located at an edge of the ground of the electronic device 2, and is close to an edge of the housing 23 of the electronic device. As shown in FIG. 3, the antenna may be located at a head position of the shark fin floor 22. In another implementation, the antenna 1 may alternatively be disposed at another position of the shark fin floor 22 and located at another position of the electronic device.

In an implementation, refer to FIG. 1. Each of the first radiator 11, the second radiator 12, and the third radiator 13 of the antenna 1 may be formed by a conductive element of the electronic device 2, for example, may be formed by a PCB, or may be formed by a flexible printed circuit (Flexible Printed Circuit, FPC for short), or may be formed through an LDS (Laser Direct Structuring, laser direct structuring) technology, or may be formed by another metal mechanical part, for example, a strip-shaped patch structure attached to a surface of the bracket. Each of the first ground element 14, the second ground element 15, the third ground element 16, the fourth ground element 17, and the feeding element 18 may be formed by a conductive element of the electronic device 2, for example, may be a metal rod or a hollow metal rod formed through a metal via hole in the bracket 21, or may be another metal mechanical part, for example, may be a metal conductive rod disposed independently relative to the bracket 21.

Figure 4:
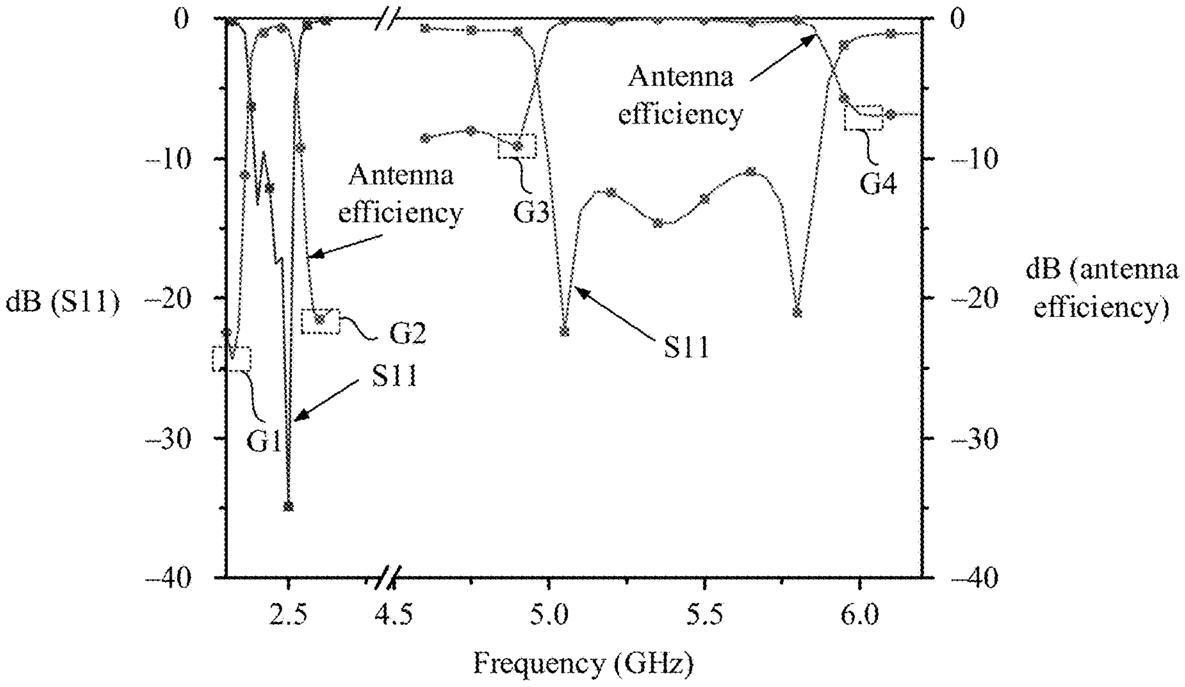
FIG. 4 is an S11 parameter curve and antenna efficiency curve diagram obtained by testing simulation effect of an antenna according to an embodiment of this application.

Simulation analysis is performed on the antenna provided in this embodiment through HFSS simulation software, to obtain an effect curve diagram shown in FIG. 4. Obtained simulation data from the curve diagram shown in FIG. 4 is shown in Table 1.

FIG. 4 is an S11 parameter curve and antenna efficiency curve diagram obtained by testing simulation effect of an antenna according to an embodiment of this application.

In FIG. 4, a horizontal coordinate indicates a frequency in a unit of GHz, a left vertical coordinate indicates an amplitude value of S11 in a unit of dB, and a right vertical coordinate indicates antenna efficiency (namely, system efficiency) in a unit of dB. S11 is one of the S parameters. S11 indicates a reflection coefficient, and can indicate antenna transmit efficiency. Specifically, a smaller value of S11 indicates a smaller return loss of the antenna, and smaller energy reflected by the antenna, that is, indicates more energy actually entering the antenna.

It should be noted that, −6 dB is usually used as a standard value of S11 in engineering. When a value of S11 of the antenna is less than −6 dB, it may be considered that the antenna can operate normally, or it may be considered that the antenna transmit efficiency is relatively good.

The system efficiency actual efficiency obtained by matching an antenna port, that is, the system efficiency of the antenna is the actual efficiency (namely, efficiency) of the antenna. A person skilled in the art may understand that efficiency is usually indicated by a percentage, and there is a corresponding conversion relationship between the efficiency and dB. Efficiency closer to 0 dB indicates better antenna efficiency.

It can be learned from FIG. 4 that two operating frequency bands of the antenna are a first operating frequency band 2.4 from GHz to 2.52 GHz and a second operating frequency band from 5 GHz to 5.88 GHz, and S11 values of the antenna in the two operating frequency bands are both less than −10 dB.

When the antenna is in the first operating frequency band, low frequency parts (with reference to the foregoing for understanding) of three radiators of the antenna respectively operate at 2.4 GHz, 2.46 GHz, and 2.5 GHz. In addition, one radiation null (the antenna efficiency is less than −20 dB) is generated at one frequency point, namely, a first target frequency point G1, which is equal to 2.32 GHz, at an upper edge of the current operating frequency band of the antenna, and one radiation null (the antenna efficiency is less than −20 dB) is generated at one frequency point, namely, a second target frequency point G2, which is equal to 2.58 GHZ, at a lower edge of the first operating frequency band of the antenna. Moreover, in the first operating frequency band of the antenna, an efficiency curve is flat and efficiency is relatively high; outside the first operating frequency band of the antenna, the efficiency curve has a steep edge, the antenna efficiency is sharply reduced, and out-of-band suppression efficiency is greater than −20 dB, implementing a filtering function.

When the antenna is in the second operating frequency band, high frequency parts (with reference to the foregoing for understanding) of the three radiators of the antenna respectively operate at 5.05 GHZ, 5.35 GHZ, and 5.8 GHz. In addition, one radiation null (the antenna efficiency is less than −10 dB) is generated at one frequency point, namely, the first target frequency point G3, which is equal to 4.9 GHZ, at an upper edge of the current operating frequency band of the antenna, and one radiation null (the antenna efficiency is less than −7 dB) is generated at one frequency point, namely, the second target frequency point G4, which is equal to 6.05 GHZ, at a lower edge of the current operating frequency band of the antenna. Moreover, in the second operating frequency band of the antenna, an efficiency curve is flat and efficiency is relatively high; outside the second operating frequency band of the antenna, the efficiency curve has a steep edge, the antenna efficiency is sharply reduced, and out-of-band suppression effect is greater than −7 dB, implementing a filtering function.

Figure 5A:
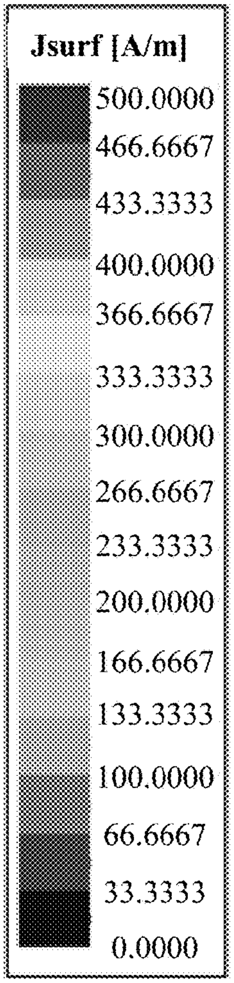
FIG. 5*a* to FIG. 5*c* are antenna current distribution diagrams obtained by testing simulation effect of an antenna in a first operating frequency band according to an embodiment of this application.
Figure 5A:
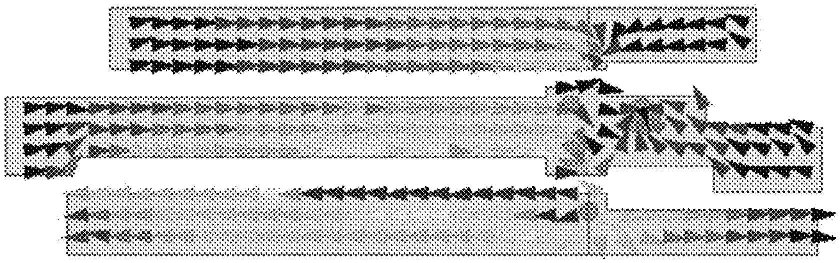
Figure 5B:
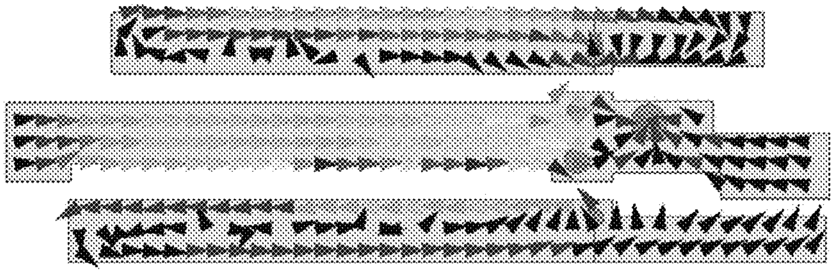
Figure 5C:
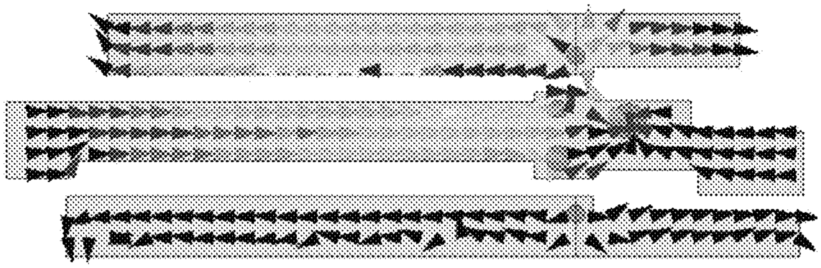
Figure 6A:
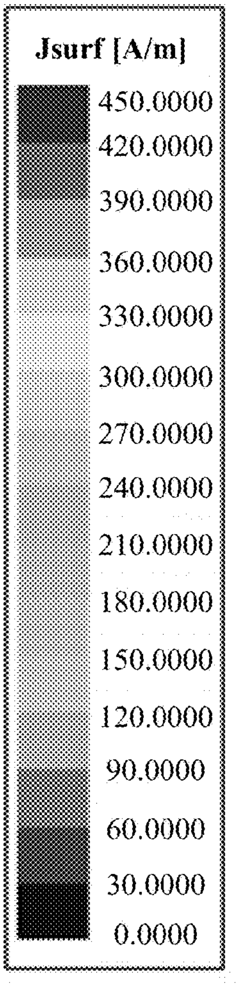
FIG. 6*a* to FIG. 6*c* are antenna current distribution diagrams obtained by testing simulation effect of an antenna in a second operating frequency band according to an embodiment of this application.
Figure 6A:
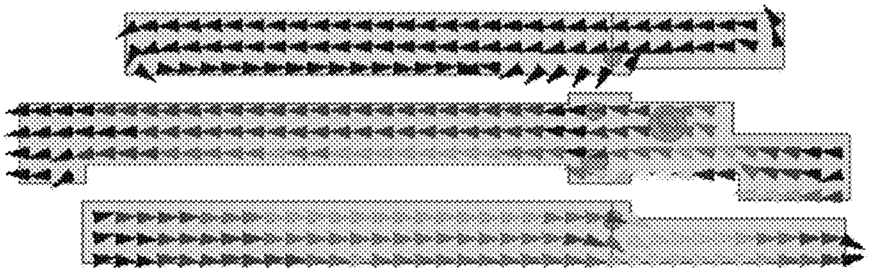
Figure 6B:
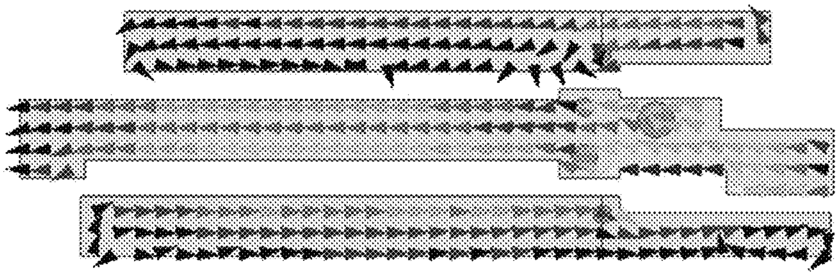
Figure 6C:
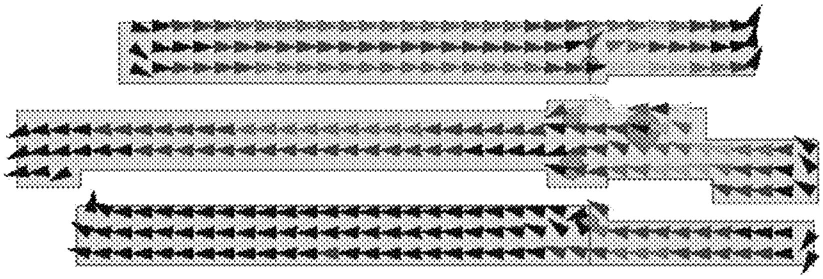

Refer to FIG. 5*a* to FIG. 6*c*. FIG. 5*a* to FIG. 5*c* are antenna current distribution diagrams obtained by testing simulation effect of an antenna in a first operating frequency band according to an embodiment of this application. FIG. 6*a* to FIG. 6*c* are antenna current distribution diagrams obtained by testing simulation effect of an antenna in a second operating frequency band according to an embodiment of this application.

An arrow indicates a current direction on a radiator of the antenna. It can be learned from FIG. 5*a* to FIG. 5*c* that when the antenna is in the first operating frequency band from 2.4 GHz to 2.52 GHz, the low frequency parts of the three radiators operate simultaneously. It can be learned from FIG. 6*a* to FIG. 6*c* that when the antenna is in the second operating frequency band from 5 GHz to 5.88 GHz, the high frequency parts of the three radiators operate simultaneously.

Figure 7:
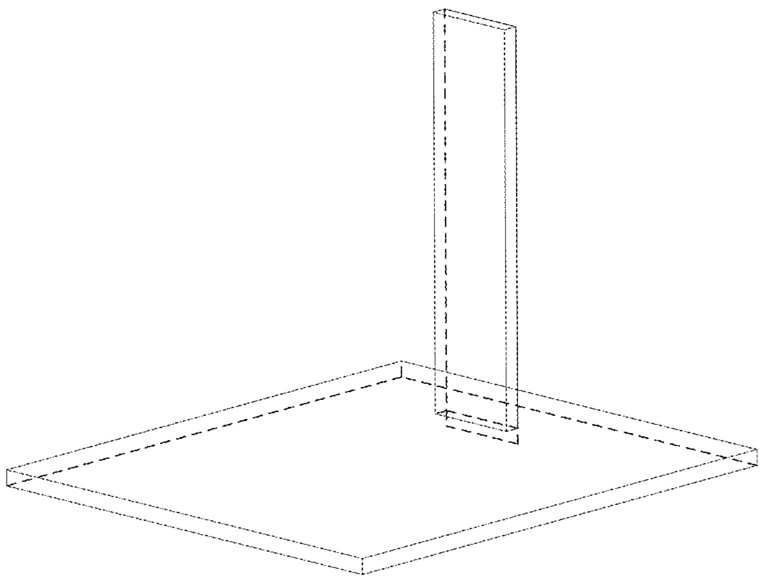
FIG. 7 is a schematic diagram of a structure of a monopole antenna in a reference design.

FIG. 7 is a schematic diagram of a structure of a monopole antenna in a reference design.

Figure 8:
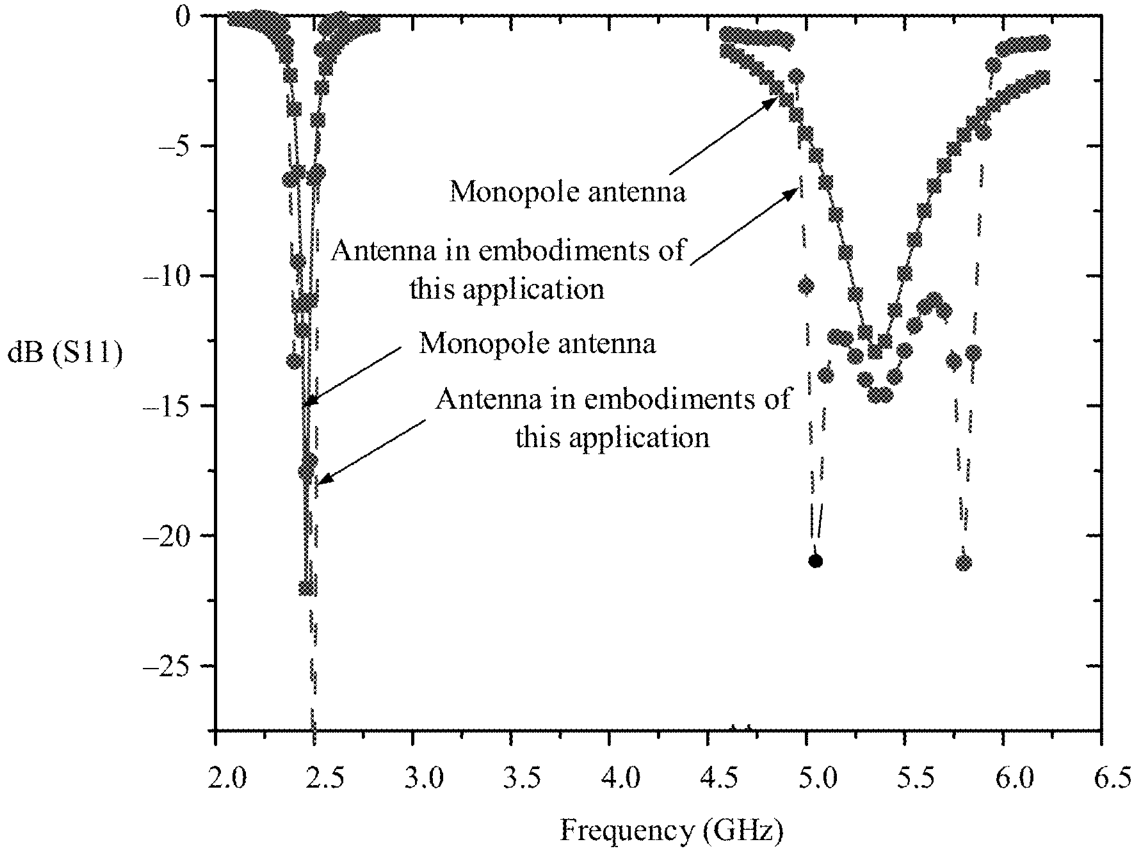
FIG. 8 is a comparative effect curve diagram of an S11 parameter obtained by testing simulation effect of each of an antenna according to an embodiment of this application and a monopole antenna.
Figure 9:
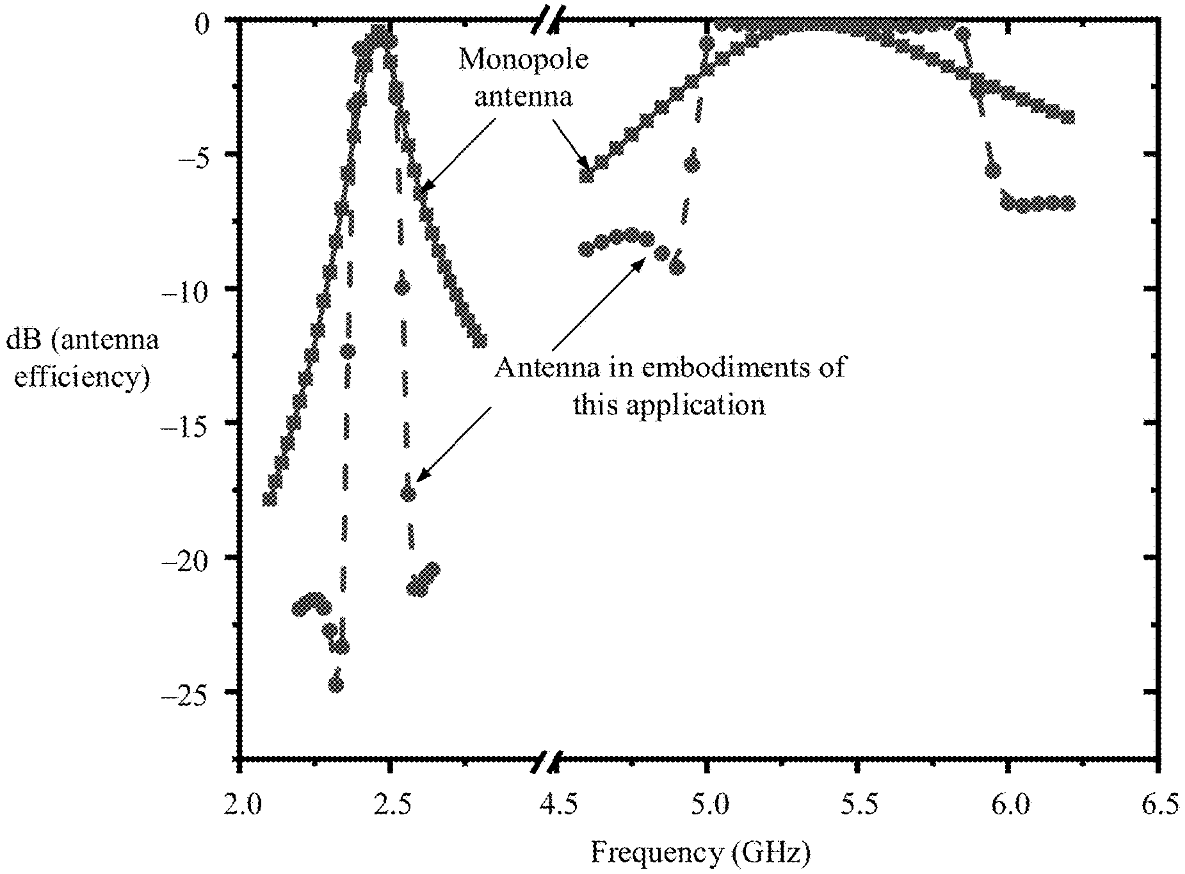
FIG. 9 is a comparative effect curve diagram of antenna efficiency obtained by testing simulation effect of each of an antenna according to an embodiment of this application and a monopole antenna.

Simulation effect is analyzed on an antenna in an embodiment and the monopole antenna in the reference design through simulation software, to obtain effect curve diagrams shown in FIG. 8 and FIG. 9. FIG. 8 is a comparative effect curve diagram of an S11 parameter obtained by testing simulation effect of each of an antenna according to an embodiment of this application and a monopole antenna. FIG. 9 is a comparative effect curve diagram of antenna efficiency obtained by testing simulation effect of each of an antenna according to an embodiment of this application and a monopole antenna.

Simulation data of the antenna in this embodiment of this application that is obtained from the curve diagrams shown in FIG. 8 and FIG. 9 is shown in Table 1, and simulation data of the monopole antenna that is obtained from the curve diagrams shown in FIG. 8 and FIG. 9 is shown in Table 2.

TABLE 2

| Parameter | Value |
|---|---|
| Height (mm) of a monopole antenna | 31 |
| Width (mm) of the monopole antenna | 6 |
| Operating frequency band of the monopole antenna | 2.35 GHz to 2.6 GHz, 4.8 GHz to 6.0 GHz |

It can be learned from FIG. 8 and FIG. 9 that, compared with the monopole antenna, the antenna in this embodiment of this application can form one radiation null (or may be understood as a point with extremely low antenna efficiency) at each of an upper edge and a lower edge outside a first operating frequency band of the antenna and each of an upper edge and a lower edge outside a second operating frequency band of the antenna, and the antenna in this embodiment of this application can show relatively good edge selectivity on the two operating frequency bands of the antenna.

Figure 10:
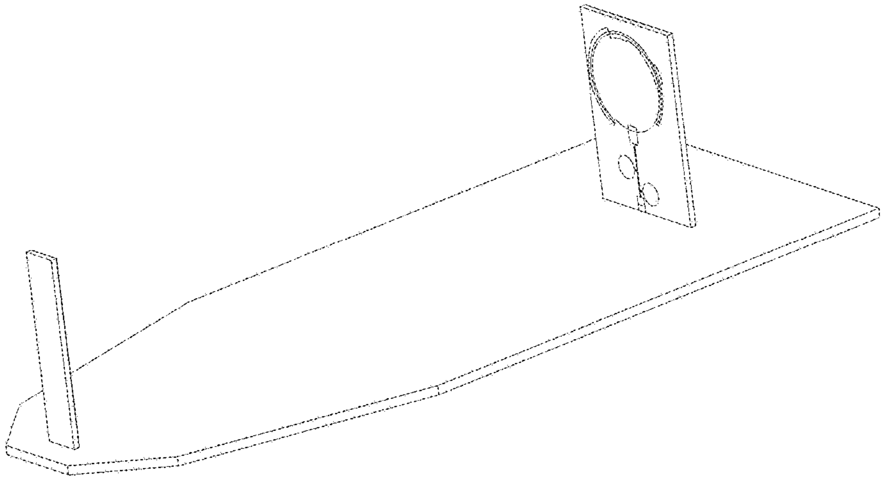
FIG. 10 is a schematic diagram of a three-dimensional structure in which a monopole antenna and a primary antenna are disposed on a shark fin floor of an electronic device.
Figure 11:
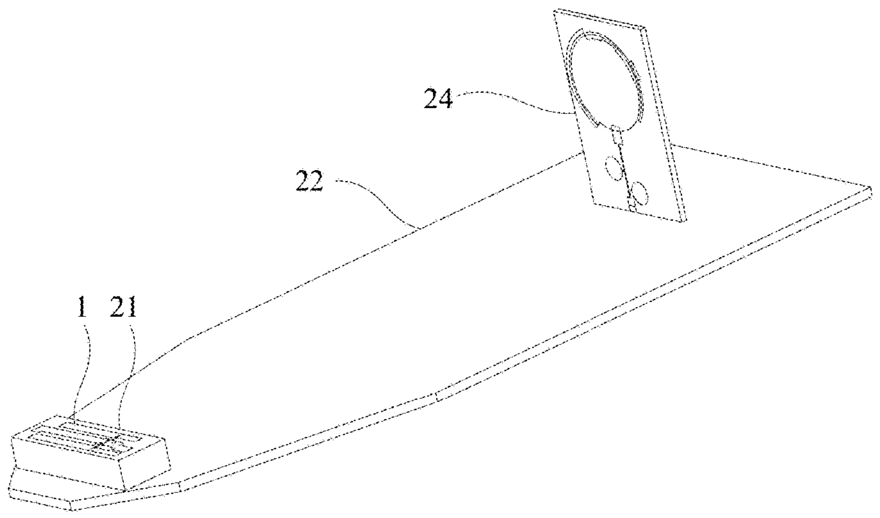
FIG. 11 is a schematic diagram of a three-dimensional structure in which an antenna according to an embodiment of this application and a primary antenna are disposed on a shark fin floor of an electronic device.

Refer to FIG. 10 and FIG. 11. FIG. 10 is a schematic diagram of a three-dimensional structure in which a monopole antenna and a primary antenna are disposed on a shark fin floor of an electronic device. FIG. 11 is a schematic diagram of a three-dimensional structure in which an antenna according to an embodiment of this application and a primary antenna are disposed on a shark fin floor of an electronic device.

The primary antenna may be understood as an antenna that is configured to transmit and receive an electromagnetic wave signal by the electronic device.

In this implementation, the antenna in this embodiment of this application is used as a Wi-Fi antenna of the electronic device, and is located at a head of a shark fin floor 22 of the electronic device. In addition, the shark fin floor 22 is used as the ground, and the primary antenna 24 is located at a tail of the shark fin floor 22.

A structure of the electronic device shown in FIG. 10 is basically the same as a structure of this embodiment of this application, and a difference lies in that the electronic device shown in FIG. 10 uses the monopole antenna as the Wi-Fi antenna.

Figure 12:
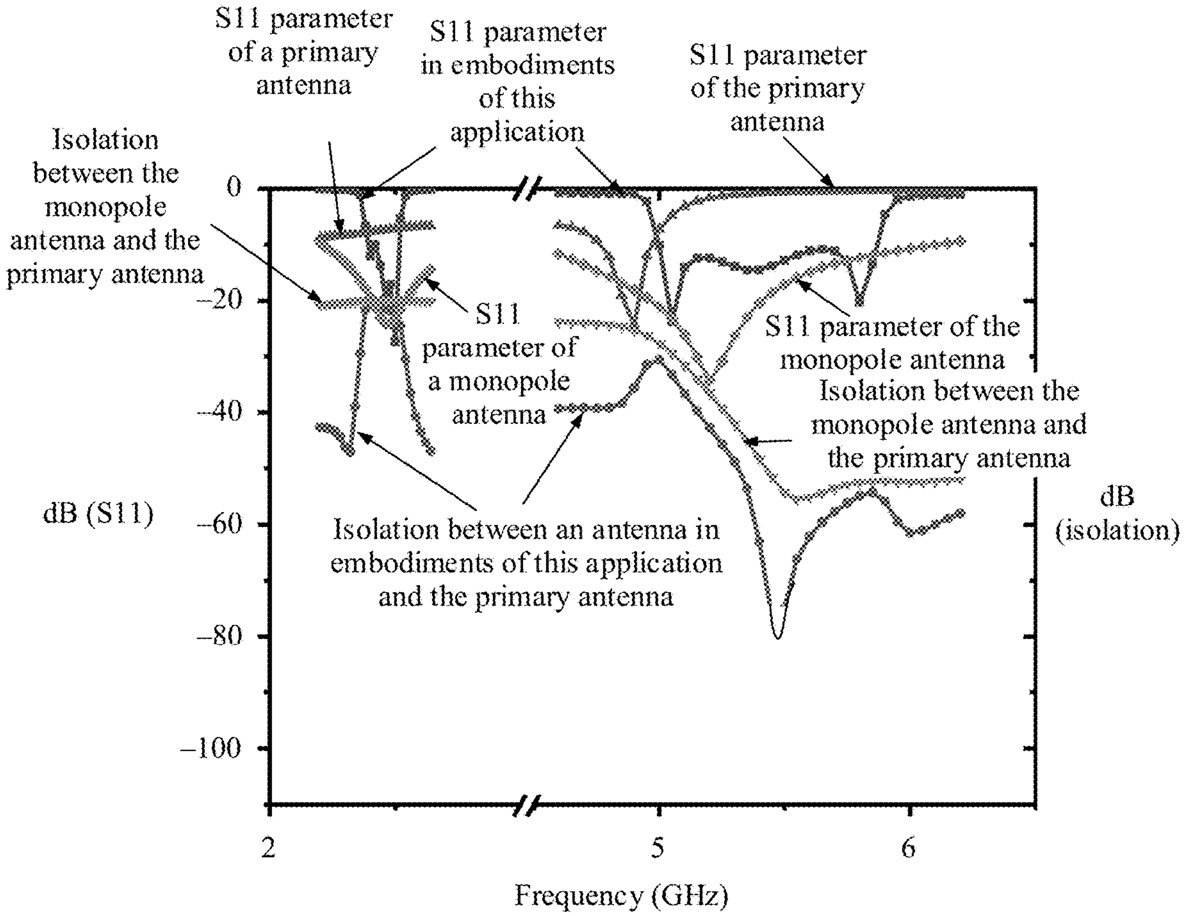
FIG. 12 is a comparative effect curve diagram of an S11 parameter and isolation of each antenna of an electronic device obtained by testing simulation effect of each of an electronic device using a monopole antenna and an electronic device using an antenna according to an embodiment of this application.

Simulation effect is analyzed on the electronic device shown in FIG. 10 and the electronic device in FIG. 11 through simulation software, to obtain an effect curve diagram shown in FIG. 12. FIG. 12 is a comparative effect curve diagram of an S11 parameter and isolation of each antenna of an electronic device obtained by testing simulation effect of each of an electronic device using a monopole antenna and an electronic device using an antenna according to an embodiment of this application. Simulation data of the antenna in this embodiment of this application that is obtained from the curve diagram shown in FIG. 12 is shown in Table 1, and simulation data of the monopole antenna is shown in Table 2.

It can be learned from FIG. 12 that, in a Wi-Fi frequency band, for example, a frequency band from 5 GHz to 5.88 GHZ, the S11 parameter of the antenna in this embodiment of this application is less than −6 dB, and isolation between the antenna in this embodiment of this application and the primary antenna is relatively high. However, outside the frequency band, the isolation between the antenna in this embodiment of this application and the primary antenna decreases sharply. In addition, compared with the monopole antenna, the antenna in this embodiment of this application can greatly improve isolation from the primary antenna without affecting normal operation.

Figure 13:
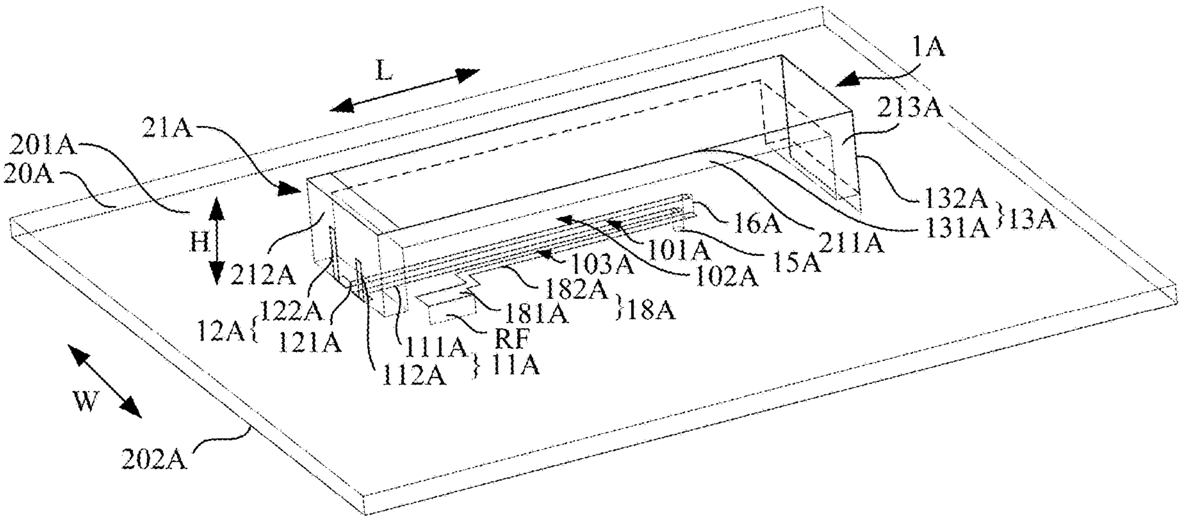
FIG. 13 is a schematic diagram of a three-dimensional structure of an antenna according to an embodiment of this application, where a first radiator, a second radiator, and a third radiator are located on at least two planes.
Figure 14:
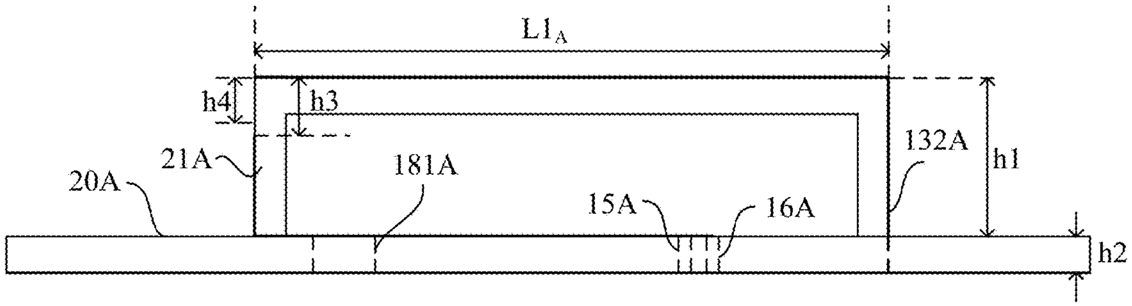
FIG. 14 is a schematic side view of a structure of an antenna according to an embodiment of this application.
Figure 15:
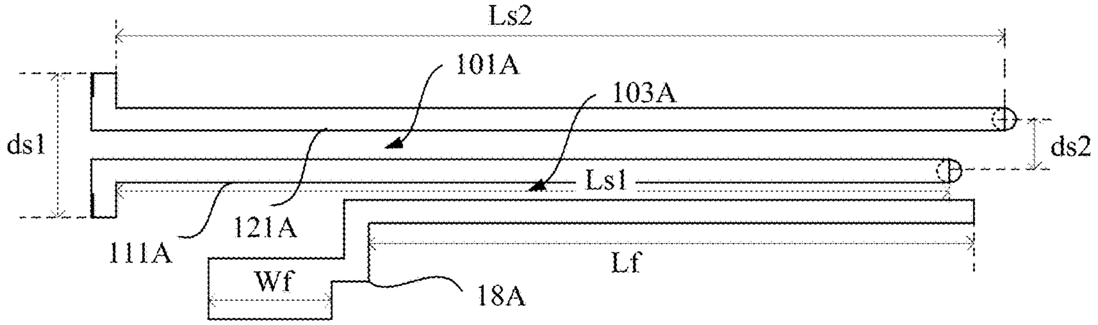
FIG. 15 is a schematic top view of a structure of an antenna according to an embodiment of this application, where a first radiator, a second radiator, and a third radiator are located on at least two planes.

Refer to FIG. 13 and FIG. 15. FIG. 13 is a schematic diagram of a three-dimensional structure of an antenna according to an embodiment of this application, where a first radiator, a second radiator, and a third radiator are located on at least two planes. FIG. 14 is a schematic side view of a structure of an antenna according to an embodiment of this application. FIG. 15 is a schematic top view of a structure of an antenna according to an embodiment of this application, where a first radiator, a second radiator, and a third radiator are located on at least two planes.

As shown in FIG. 13, the antenna 1A includes a first radiator 11A, a second radiator 12A, a third radiator 13A, a first ground element 15A, and a second ground element 16A.

The first radiator 11A includes a primary radiator section 111A and a secondary radiator section 112A that are sequentially connected. The second radiator 12A includes a primary radiator section 121A and a secondary radiator section 122A that are sequentially connected. The third radiator 13A includes a primary radiator section 131A and a secondary radiator section 132A that are sequentially connected.

The primary radiator section 111A of the first radiator 11A and the primary radiator section 121A of the second radiator 12A are spaced from each other in a first direction W on a same plane, to form a first gap 101A.

A first end of the primary radiator section 111A of the first radiator 11A is connected to a first end of the secondary radiator section 112A, a second end of the primary radiator section 111A is connected to a first end of the first ground element 15A, and a second end of the first ground element 15A is grounded.

A first end of the primary radiator section 121A of the second radiator 12A is connected to a first end of the secondary radiator section 122A, a second end of the primary radiator section 121A is connected to a first end of the second ground element 16A, and a second end of the second ground element 16A is grounded.

In an implementation, both the first ground element 15A and the second ground element 16A extend in a second direction H, and both the second end of the first ground element 15A and the second end of the second ground element 16A are short-circuited and grounded through metal via holes. In an implementation, a cross section of the first ground element 15A and a cross section of the second ground element 16A are both in a circular shape. In another alternative implementation, the cross sections may be in a rectangular shape or in another shape.

In addition, the radiator is not limited in a shape, and may be in a triangle shape, a square ring shape, a circular ring shape, a sector shape, or the like.

A first end of the primary radiator section 131A of the third radiator 13A is connected to a first end of the secondary radiator section 132A, and a second end of the secondary radiator section 132A is grounded. In addition, the secondary radiator section 112A, the secondary radiator section 122A, and the secondary radiator section 132A all extend in the second direction H.

The primary radiator section 131A of the third radiator 13A is spaced from and disposed opposite to the first radiator 11A and the second radiator 12A in the second direction H, to form a second gap 102A.

In the second direction H, both a second end of the secondary radiator section 112A of the first radiator 11A and a second end of the secondary radiator section 122A of the second radiator 12A are coupled to a second end of the primary radiator section 131A of the third radiator 13A through the second gap 102A. The second end of the secondary radiator section 112A of the first radiator 11A is coupled to the second end of the primary radiator section 131A of the third radiator 13A mainly through a gap between the second end of the secondary radiator section 112A and the second end of the primary radiator section 131A of the third radiator 13A. The second end of the secondary radiator section 122A of the second radiator 12A is coupled to the second end of the primary radiator section 131A of the third radiator 13A mainly through a gap between the second end of the secondary radiator section 122A and the second end of the primary radiator section 131A of the third radiator 13A. In this implementation, the third radiator 13A is used as a primary radiator of the antenna 1A, or may be understood as a radiator with highest radiation intensity. In an implementation, the primary radiator section 111A and the primary radiator section 121A are both in an L shape.

The antenna 1A further includes a feeding element 18A. The feeding element 18A and the primary radiator section 111A of the first radiator 11A are spaced from each other in the first direction W on a same plane, to form a third gap 103A. The feeding element 18A is configured to be connected to a radio frequency source RF, and enable the first radiator 11A to receive a feeding signal based on coupling through the third gap 103A.

In an implementation, the feeding element 18A includes a first node 181A and a second node 182A that are sequentially connected, and the first node 181A is connected to the radio frequency source RF. In an implementation, the first node 181A is in a strip shape, and the second node 182A is in an L shape. In an implementation, the feeding element 18A may be of a non-resonating node (Non-resonating Node, NRN) structure.

The radio frequency source RF may be a radio frequency chip, or may be another radio frequency apparatus that can transmit a radio frequency signal.

A plane parallel to the first direction W and the third direction L is used as a projection plane. Projections of the first radiator 11A, the second radiator 12A, and the feeding element 18A on the projection plane are all located in a projection of the third radiator 13A on the projection plane.

As shown in FIG. 15, a plane parallel to a longitudinal section of the first radiator 11A is used as a projection plane, and both a projection of the first radiator 11A on the projection plane and a projection of the feeding element 18A on the projection plane are located in a projection of the second radiator 12A on the projection plane. A part of the projection of the feeding element 18A on the projection plane is located in the projection of the first radiator 11A on the projection plane, and a remaining part is located outside the projection of the first radiator 11A on the projection plane.

In an implementation, the first end of the primary radiator section 111A of the first radiator 11A and the first end of the primary radiator section 121A of the second radiator 12A are aligned in the third direction L.

In an implementation, at least some radiator sections of the first radiator 11A, at least some radiator sections of the second radiator 12A, and at least some radiator sections of the third radiator 13A are disposed on a bracket 21A of the electronic device.

In an implementation, the PCB 20A of the electronic device includes a dielectric substrate 201A and a ground metal layer 202A located on a lower surface of the dielectric substrate 201A. The ground metal layer 202A is used as a ground in this embodiment of this application.

In an implementation, the bracket 21A is in a U shape, and the bracket 21A includes a bracket body 211A, and a connection portion 212A and a connection portion 213A that are connected to both ends of the bracket body 211A. Both the secondary radiator section 112A of the first radiator 11A and the secondary radiator section 122A of the second radiator 12A are etched on a side surface that is of the connection portion 212A and that is away from the bracket body 211A. Both the primary radiator section 111A of the first radiator 11A and the primary radiator section 121A of the second radiator 12A are etched on an upper surface of the dielectric substrate 201A of the PCB 20A. The feeding element 18A is also etched on the upper surface of the dielectric substrate 201A of the PCB 20A. It should be noted that the bracket 21A may be a dielectric block.

The primary radiator section 131A of the third radiator 13A is etched on an upper surface that is of the bracket body 211A and that is away from the PCB 20A. The secondary radiator section 132A of the third radiator 13A is etched on a side surface that is of the connection portion 213A and that is away from the bracket body 211A. In another alternative implementation, the radiator may be disposed on another surface of the bracket 21A through another processing technology. This is not limited in this application. The bracket 21A may alternatively be in another shape, for example, in an arch shape.

In addition, an antenna height in this embodiment of this application is not limited. The antenna height may be understood as a distance between the ground and an upper surface of a radiator (for example, the third radiator 13A) that is farthest from a floor. In an implementation, the antenna height is as follows: 4 mm≤the antenna height≤6 mm. For example, the antenna height may be 5 mm.

The antenna in this embodiment of this application has a compact structure and a small size. An example of the antenna size is 21 mm*6 mm*5.4 mm. Certainly, when the antenna in this embodiment of this application is applied to different electronic devices and is applicable to different operating frequency bands, the antenna size may be another size.

In this embodiment of this application, the first radiator 11A, the second radiator 12A, the third radiator 13A, and the feeding element 18A are spaced from each other, and the first ground element 15A and the second ground element 16A are connected to the corresponding radiators, to form a new antenna structure. In this way, a hybrid coupling of an electrical coupling and a magnetic coupling can be simultaneously formed between the radiators, generating a third-order Chebyshev bandpass filtering response. The third radiator 13A may be considered as a last-order resonator of a third-order Chebyshev filter, to construct an antenna having a filtering function. The antenna is capable of generating two radiation nulls (or may be understood as points with extremely low antenna efficiency) outside an operating frequency band of the antenna without changing a radiation characteristic of the antenna, so that the antenna in this embodiment of this application can receive a radio frequency signal in the operating frequency band, and suppress a radio frequency signal outside the operating frequency band. This implements a filtering function without changing a radiation characteristic of the antenna, helps improve isolation between different-frequency antennas of the electronic device, and further improves an anti-interference capability of the electronic device.

In addition, the antenna in this embodiment of this application has features such as a simple feeding structure, a compact antenna structure, and a small size. This may contribute to miniaturization, lightness and thinness of the electronic device when the antenna is used in the electronic device.

In an implementation, the antenna in this embodiment of this application may be used as a Wi-Fi antenna of the electronic device. The following provides antenna parameter selection reference values that can meet use requirements of specific operating frequency bands. For details, refer to Table 3 (with reference to FIG. 13 to FIG. 15 for understanding).

TABLE 3

| Parameter | Value |
|---|---|
| Length (mm) of a bracket body 211A: $L1_A$ | 20.4 |
| Height h1 (mm) of a connection portion 213A | 4.4 |

TABLE 3-continued

| Parameter | Value |
|---|---|
| Thickness h2 (mm) of a PCB 20A (mm) | 1 |
| Height difference h3 (mm) between a second end of a secondary radiator section 112A and a second end of a primary radiator section 131A | 2.3 |
| Height difference h4 (mm) between a second end of a secondary radiator section 122A and the second end of the primary radiator section 131A | 1.6 |
| Length Ls1 (mm) of a horizontal part of a primary radiator section 111A | 13.5 |
| Length Ls2 (mm) of a horizontal part of a primary radiator section 121A | 14.4 |
| Spacing ds1 (mm) | 1.7 |
| Spacing ds2 (mm) | 0.5 |
| Length Lf (mm) of a second node 182A in a third direction L | 9.8 |
| Length Wf (mm) of a first node 181A in the third direction L | 2 |
| Operating frequency band of an antenna | 2.35 GHz to 2.6 GHz |

It should be noted that the foregoing is merely an example of parameter selection of a 2.4 GHz Wi-Fi antenna. When the antenna in this embodiment of this application is used as another antenna or is applicable to another operating frequency band, parameter selection may be adjusted based on an actual application scenario of the antenna. This is not limited in this application.

This application further provides an electronic device, including the antenna 1A in any one of the foregoing implementations.

In an implementation, refer to FIG. 13 for understanding. In an implementation, refer to FIG. 1 for understanding. The feeding element 18A, the first radiator 11A, the second radiator 12A, and the third radiator 13A of the antenna 1A may be formed by a conductive element of the electronic device, for example, may be formed by a PCB, or may be formed by a flexible printed circuit (Flexible Printed Circuit, FPC for short), or may be formed through an LDS (Laser Direct Structuring, laser direct structuring) technology, or may be formed by another metal mechanical part, for example, a strip-shaped patch structure attached to a surface of the bracket. The first ground element 15A and the second ground element 16A may be formed by a conductive element of the electronic device, for example, may be a metal rod or a hollow metal rod formed through a metal via hole in the dielectric substrate 201A of the PCB 20A, or may be another metal mechanical part, for example, may be an independently disposed metal conductive rod.

Figure 16:
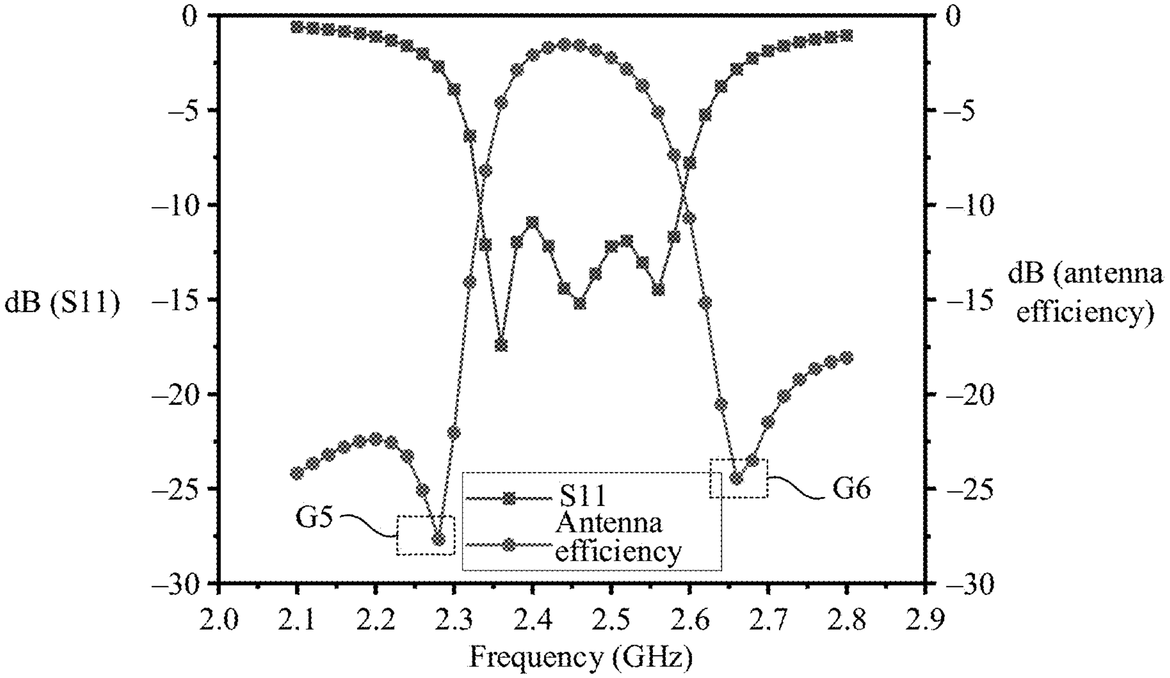
FIG. 16 is an S11 parameter curve and antenna efficiency curve diagram obtained by analyzing simulation effect of an antenna according to an embodiment of this application.

Simulation analysis is performed on the antenna provided in this embodiment through HFSS simulation software, to obtain an effect curve diagram shown in FIG. 16. Obtained simulation data from the curve diagram shown in FIG. 16 is shown in Table 3.

It can be learned from FIG. 16 that an operating frequency band of the antenna is 2.35 GHz to 2.6 GHZ, and an S11 value of the antenna in the operating frequency band is less than −10 dB.

Three resonance frequencies generated by the three radiators of the antenna are 2.36 GHz, 2.46 GHZ, and 2.56 GHz. In addition, one radiation null (the antenna efficiency is less than −20 dB) is generated at one frequency point, namely, a first target frequency point G5, which is equal to 2.28 GHZ, at an upper edge of the operating frequency band of the antenna, and one radiation null (the antenna efficiency is less than −20 dB) is generated at one frequency point, namely, a second target frequency point G6, which is equal to 2.66 GHz, at a lower edge of the first operating frequency band of the antenna. In the operating frequency band of the antenna, an efficiency curve is flat and efficiency is relatively high; outside the operating frequency band of the antenna, the efficiency curve has a steep edge, the antenna efficiency is sharply reduced, and out-of-band suppression effect is greater than −17.5 dB, implementing a filtering function.

Figure 17A:
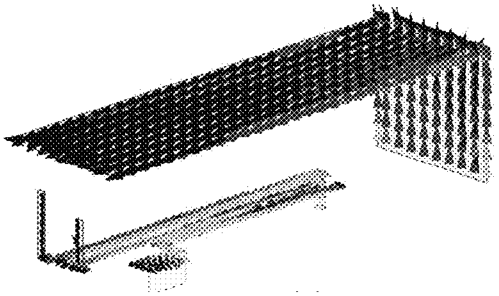
FIG. 17*a* to FIG. 17*c* are antenna current distribution diagrams obtained by analyzing simulation effect of an antenna according to an embodiment of this application.
Figure 17B:
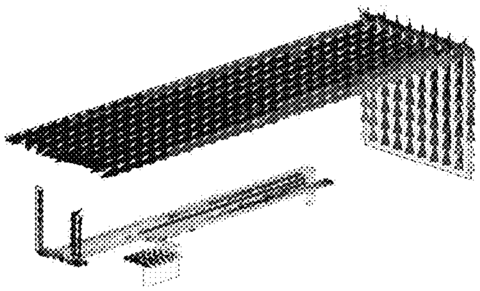
Figure 17C:
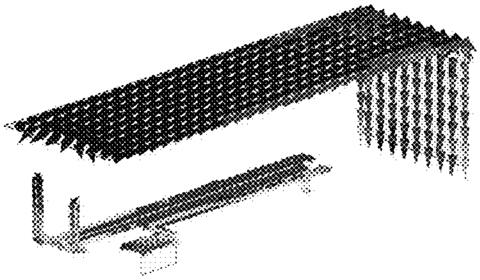

FIG. 17*a* to FIG. 17*c* are antenna current distribution diagrams obtained by analyzing simulation effect of an antenna according to an embodiment of this application. It can be learned from FIG. 17*a* to FIG. 17*c* that, the first radiator 11A, the second radiator 12A, and the third radiator 13A operate at 2.36 GHz, 2.46 GHZ, and 2.56 GHz respectively, currents at resonant frequencies are mainly concentrated on the feeding element 18A, the first radiator 11A, and the second radiator 12A, and current intensity on the third radiator 13A is relatively weak.

Figure 18A:
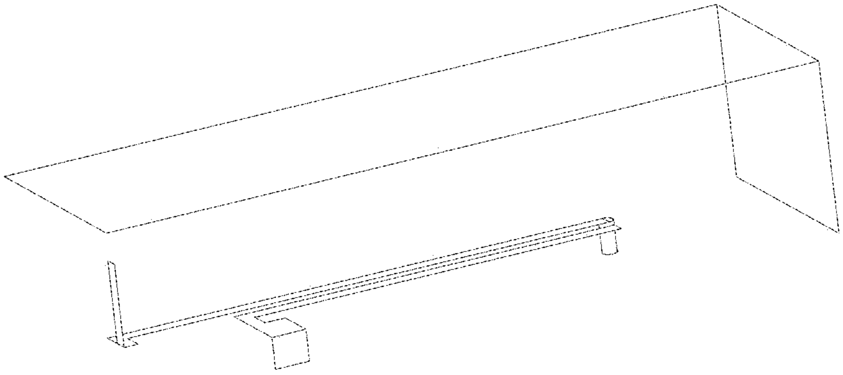
FIG. 18*a* to FIG. 18*c* are respectively schematic diagrams of structural principles of an antenna in a first reference design, an antenna in a second reference design, and an antenna in a third reference design.
Figure 18B:
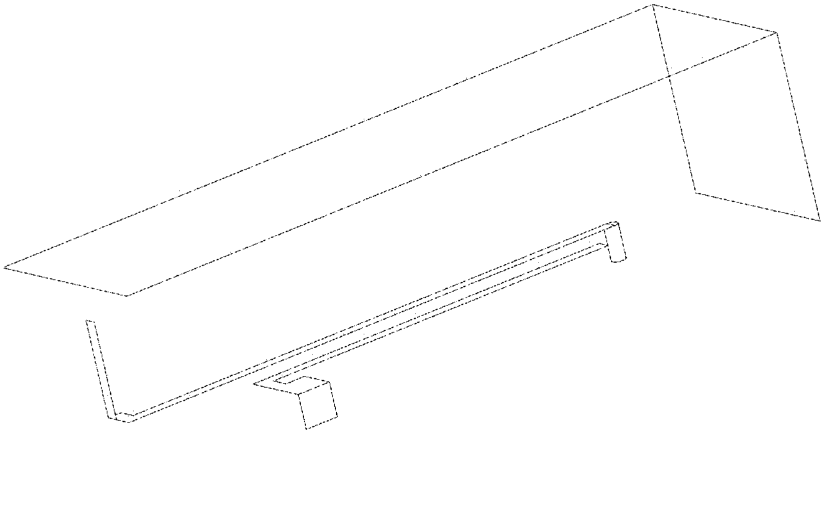
Figure 18C:
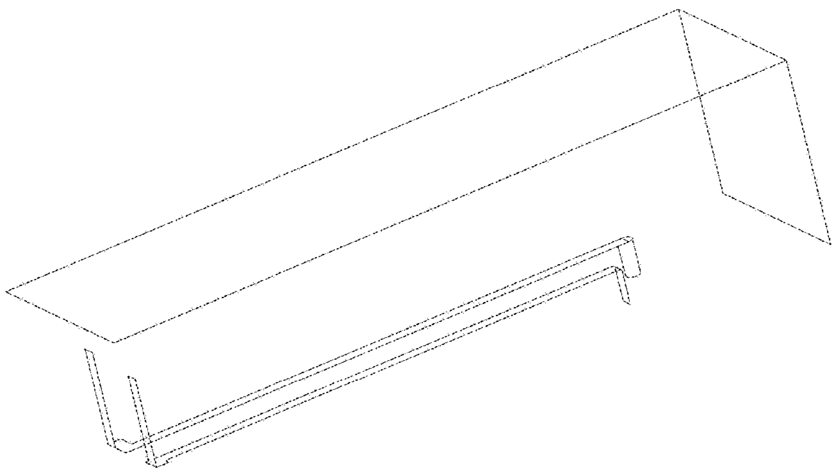

FIG. 18*a* to FIG. 18*c* are respectively schematic diagrams of structural principles of an antenna in a first reference design, an antenna in a second reference design, and an antenna in a third reference design.

Figure 19:
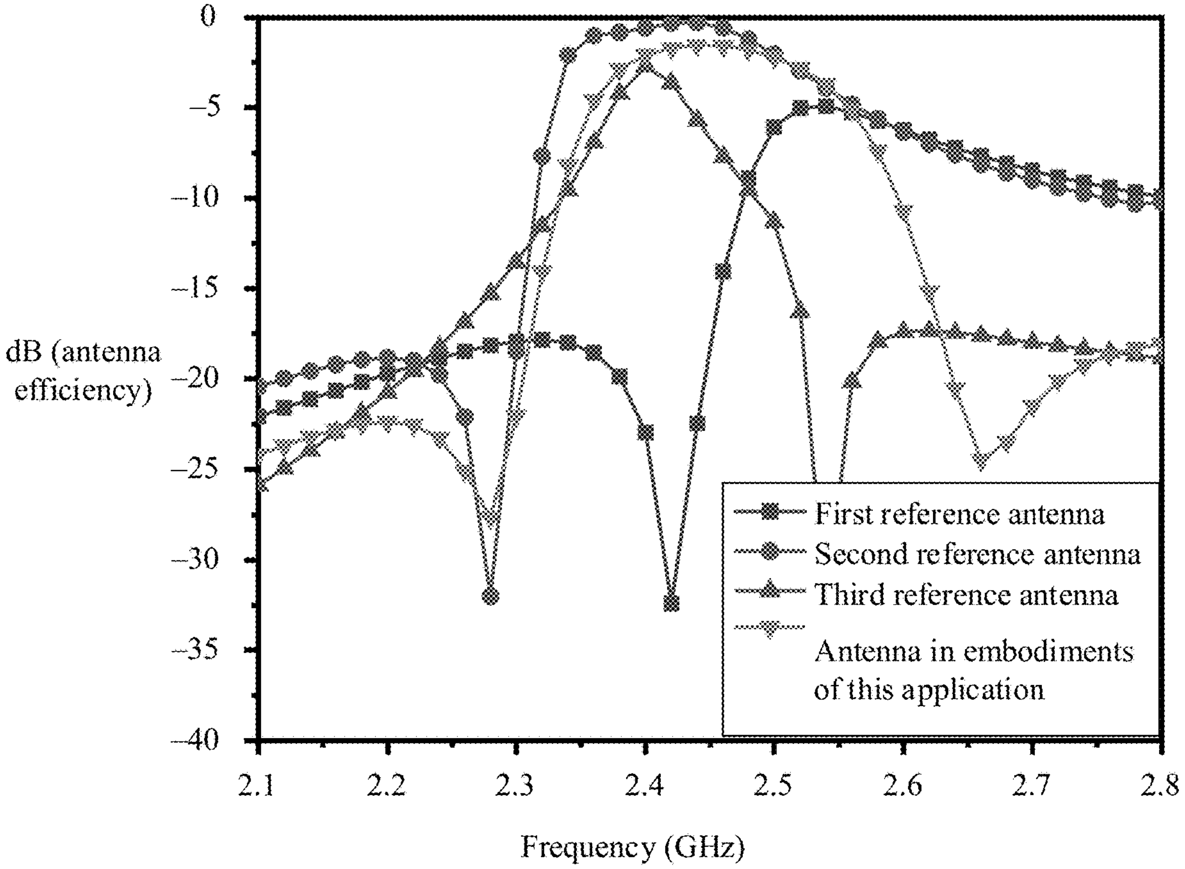
FIG. 19 is a comparative effect curve diagram of antenna efficiency obtained by testing simulation effect of each of an antenna according to an embodiment of this application and antennas in three reference designs.

Simulation effect is separately tested for the antennas in the three reference designs shown in FIG. 18*a* to FIG. 18*c* and an antenna in an embodiment of this application through simulation software, to obtain an effect curve diagram shown in FIG. 19. FIG. 19 is a comparative effect curve diagram of antenna efficiency obtained by testing simulation effect of each of an antenna according to an embodiment of this application and antennas in three reference designs.

It can be learned from FIG. 19 that each of the antenna in the first reference design and the antenna in the second reference design can form only one radiation null at one frequency at the upper edge of the operating frequency band of the antenna, and the antenna in the third reference design can form one radiation null only at the lower edge of the operating frequency band of the antenna. However, the antenna in this embodiment of this application is capable of generating one radiation null at each of the upper edge and the lower edge of the operating frequency band of the antenna. Therefore, this can implement a filtering function.

Figure 20:
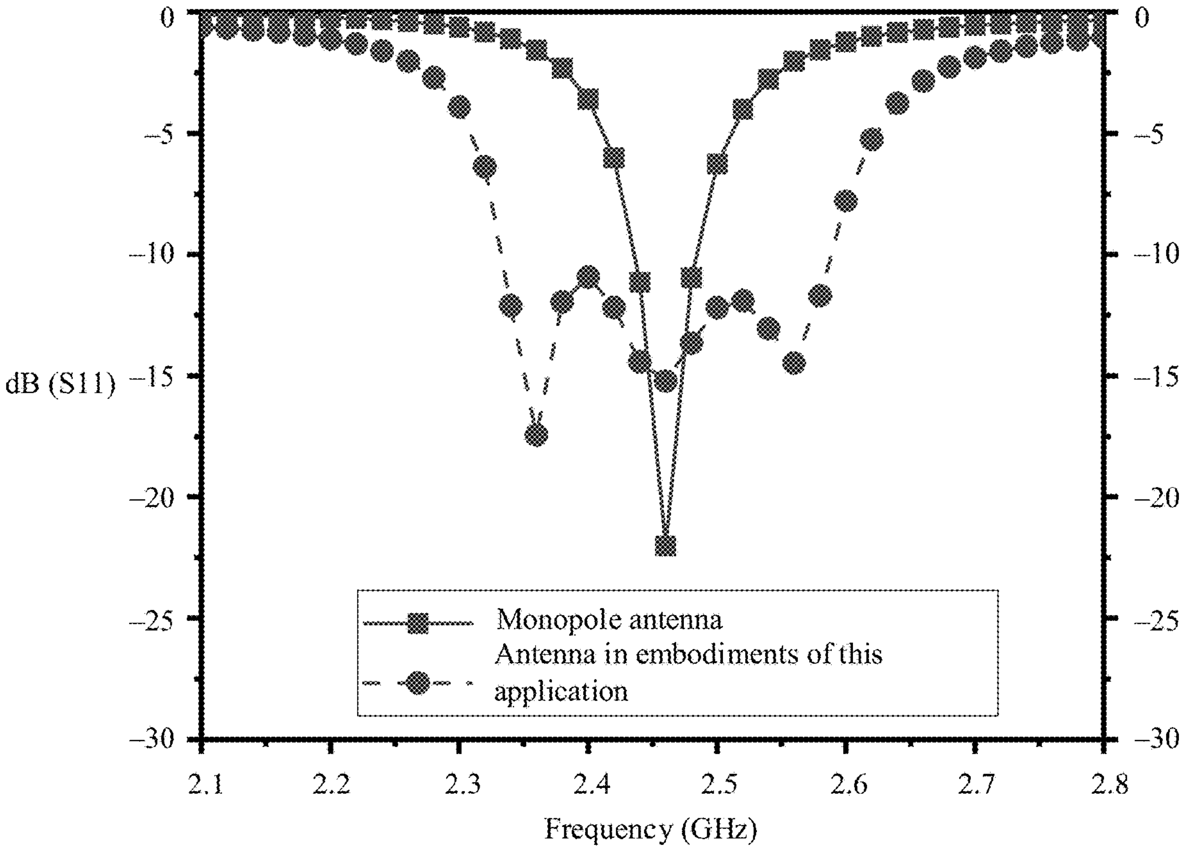
FIG. 20 is a comparative effect curve diagram of an S11 parameter obtained by testing simulation effect of each of an antenna according to an embodiment of this application and a monopole antenna.
Figure 21:
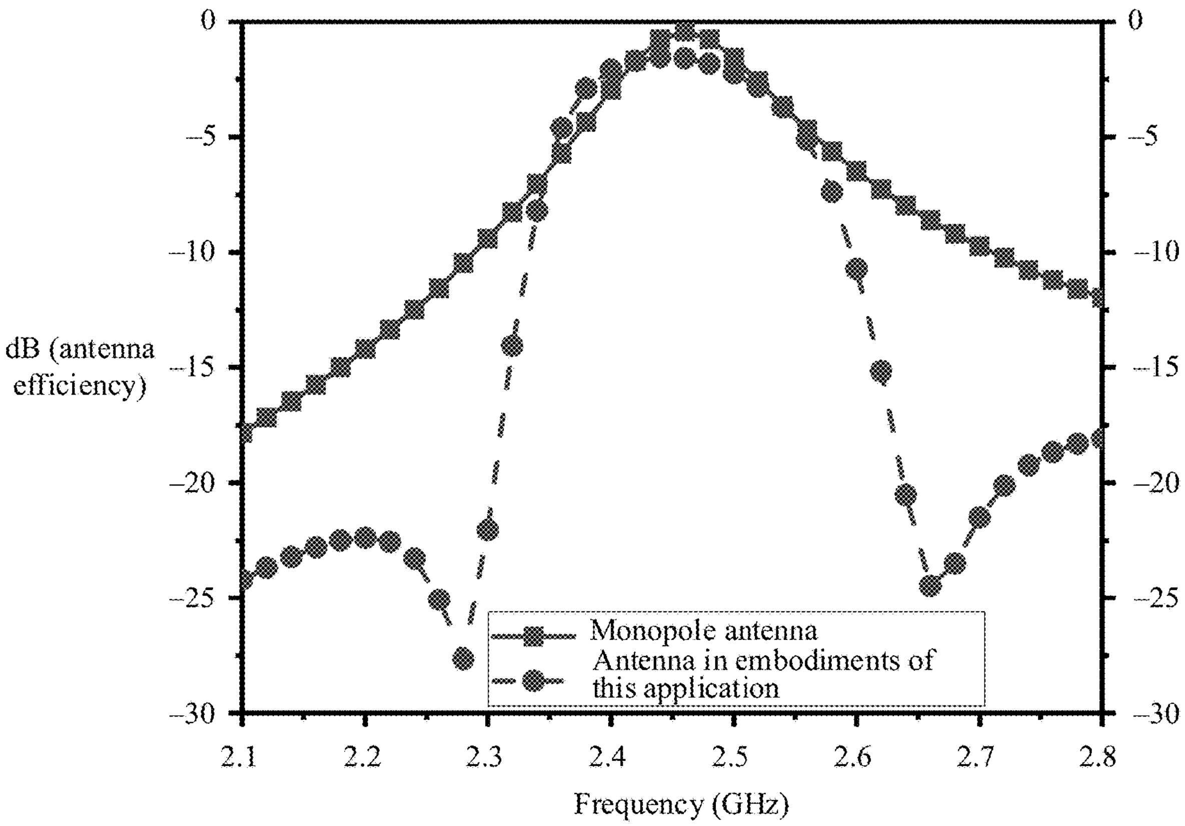
FIG. 21 is a comparative effect curve diagram of antenna efficiency obtained by testing simulation effect of each of an antenna according to an embodiment of this application and a monopole antenna.

Simulation effect is analyzed on an antenna in an embodiment and a monopole antenna in a reference design through simulation software, to obtain effect curve diagrams shown in FIG. 20 and FIG. 21. FIG. 20 is a comparative effect curve diagram of an S11 parameter obtained by testing simulation effect of each of an antenna according to an embodiment of this application and a monopole antenna. FIG. 21 is a comparative effect curve diagram of antenna efficiency obtained by separately testing simulation effect of each of an antenna according to an embodiment of this application and a monopole antenna. For a simulation parameter of the antenna in this embodiment of this application, refer to Table 3. For a structure of the monopole antenna, refer to FIG. 7 and Table 2 for understanding.

It can be learned from FIG. 20 and FIG. 21 that, compared with the monopole antenna, the antenna in this embodiment of this application can form one radiation null (or may be understood as a point with extremely low antenna efficiency) at each of an upper edge and a lower edge outside an operating frequency band of the antenna, thus showing relatively good edge selectivity.

Figure 22:
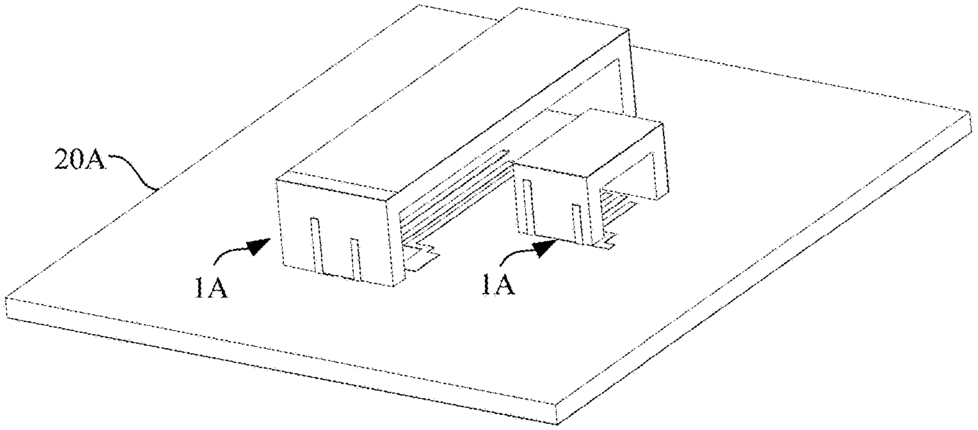
FIG. 22 is a schematic diagram of a three-dimensional structure of implementing a dual-band Wi-Fi function in an electronic device by using an antenna according to an embodiment of this application.

In an implementation, the antenna in this embodiment of this application is further applicable to an application scenario of a dual-band Wi-Fi antenna. FIG. 22 is a schematic diagram of a three-dimensional structure of implementing a dual-band Wi-Fi function in an electronic device by using an antenna according to an embodiment of this application. Two antennas 1A in this embodiment of this application are spaced from each other side by side on a PCB 20A of the electronic device. In an implementation, an operating frequency band of one of the two antennas is applicable to a Wi-Fi 2.4 GHz frequency band, and an operating frequency band of the other antenna is applicable to a Wi-Fi 5 GHz frequency band, to meet different function requirements of the electronic device.

Figure 23:
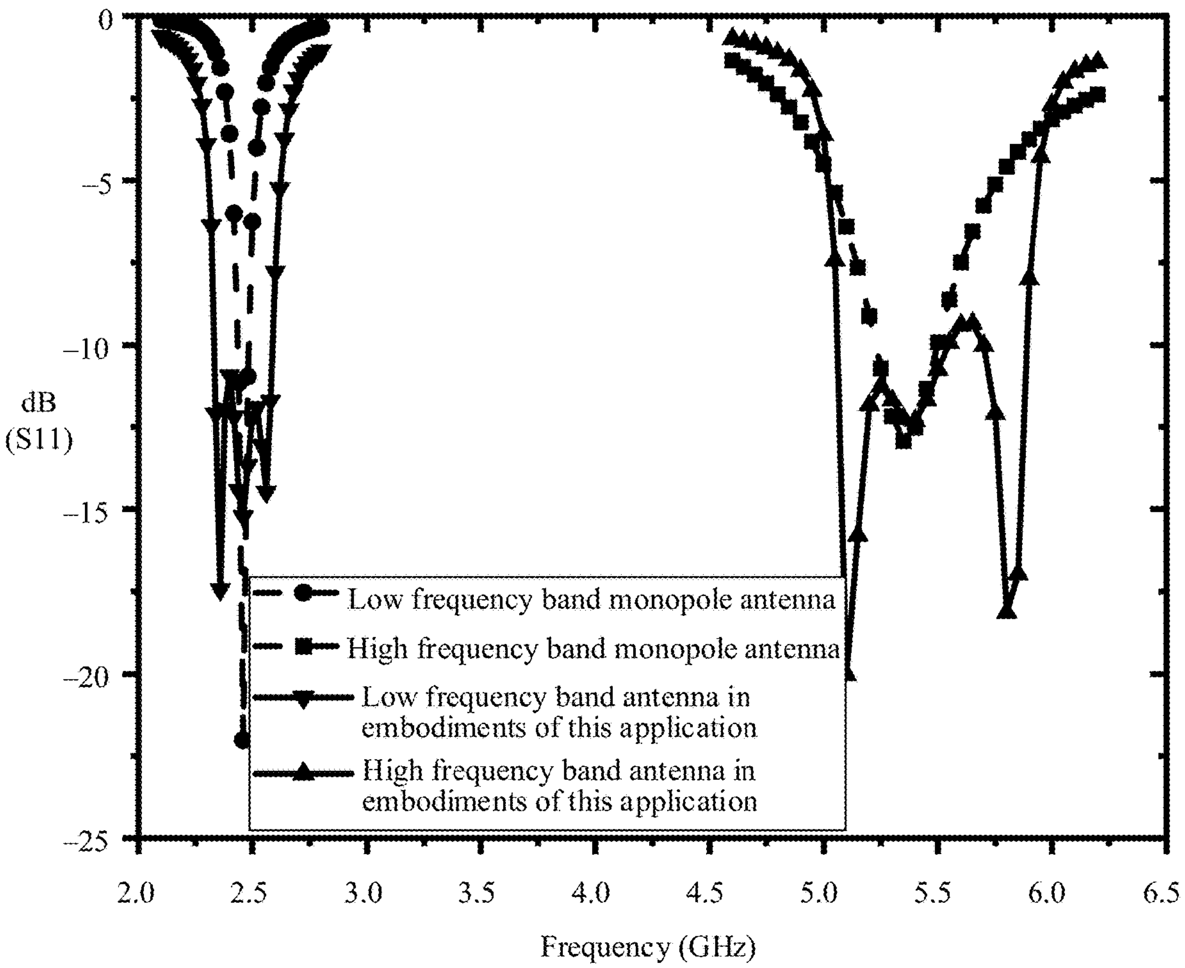
FIG. 23 is a comparative effect curve diagram of an S11 parameter obtained by testing simulation effect of each of an electronic device that uses a monopole antenna to implement a dual-band Wi-Fi function and an electronic device that uses an antenna in this embodiment of this application to implement a dual-band Wi-Fi function.
Figure 24:
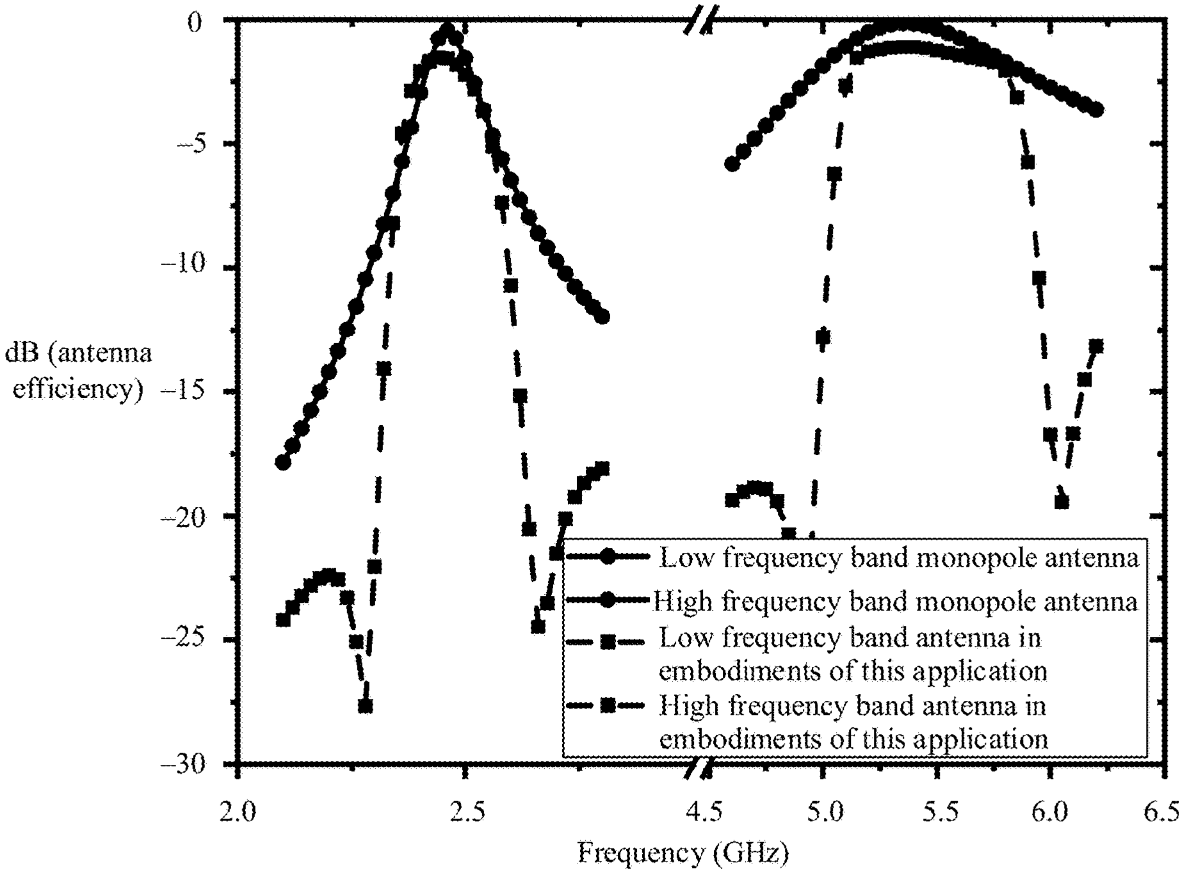
FIG. 24 is a comparative effect curve diagram of antenna efficiency obtained by testing simulation effect of each of an electronic device that uses a monopole antenna to implement a dual-band Wi-Fi function and an electronic device that uses an antenna in this embodiment of this application to implement a dual-band Wi-Fi function.

Simulation effect is separately analyzed through simulation software when the antenna in this embodiment is applied to the dual-band Wi-Fi antenna and a monopole antenna is used in the dual-band Wi-Fi antenna, to obtain effect curve diagrams shown in FIG. 23 and FIG. 24. FIG. 23 is a comparative effect curve diagram of an S11 parameter obtained by testing simulation effect of each of an electronic device that uses a monopole antenna to implement a dual-band Wi-Fi function and an electronic device that uses an antenna in this embodiment of this application to implement a dual-band Wi-Fi function. FIG. 24 is a comparative effect curve diagram of antenna efficiency obtained by testing simulation effect of each of an electronic device that uses a monopole antenna to implement a dual-band Wi-Fi function and an electronic device that uses an antenna in this embodiment of this application to implement a dual-band Wi-Fi function.

It can be learned from FIG. 23 and FIG. 24 that the antenna in this embodiment of this application is capable of generating two radiation nulls at each of an upper edge and a lower edge of an operating frequency band, so that the antenna implements a filtering function on two operating frequency bands.

Figure 25:
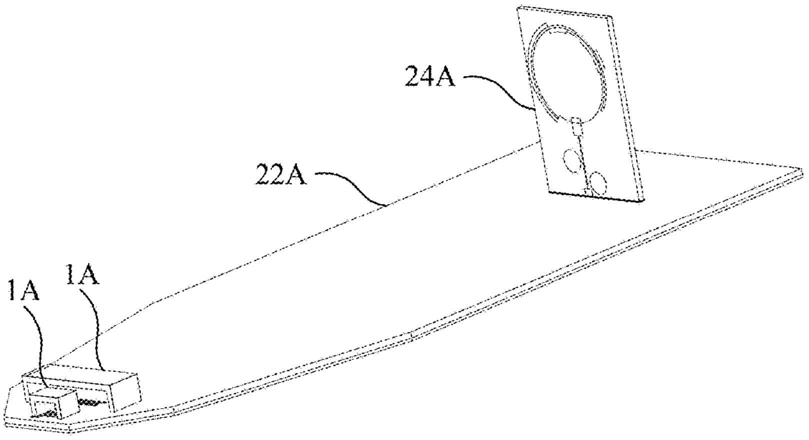
FIG. 25 is a schematic diagram of a three-dimensional structure in which an antenna according to an embodiment of this application and a primary antenna are disposed on a shark fin floor of an electronic device.

FIG. 25 is a schematic diagram of a three-dimensional structure in which an antenna according to an embodiment of this application and a primary antenna are disposed on a shark fin floor of an electronic device.

In this implementation, the antenna in this embodiment of this application is used as a Wi-Fi antenna of the electronic device, and there are two antennas. The two antennas are spaced from each other side by side at a head of the shark fin floor 22A of the electronic device. In addition, the shark fin floor 22A is used as the ground, and the primary antenna 24A is located at a tail of the shark fin floor 22A.

Figure 26:
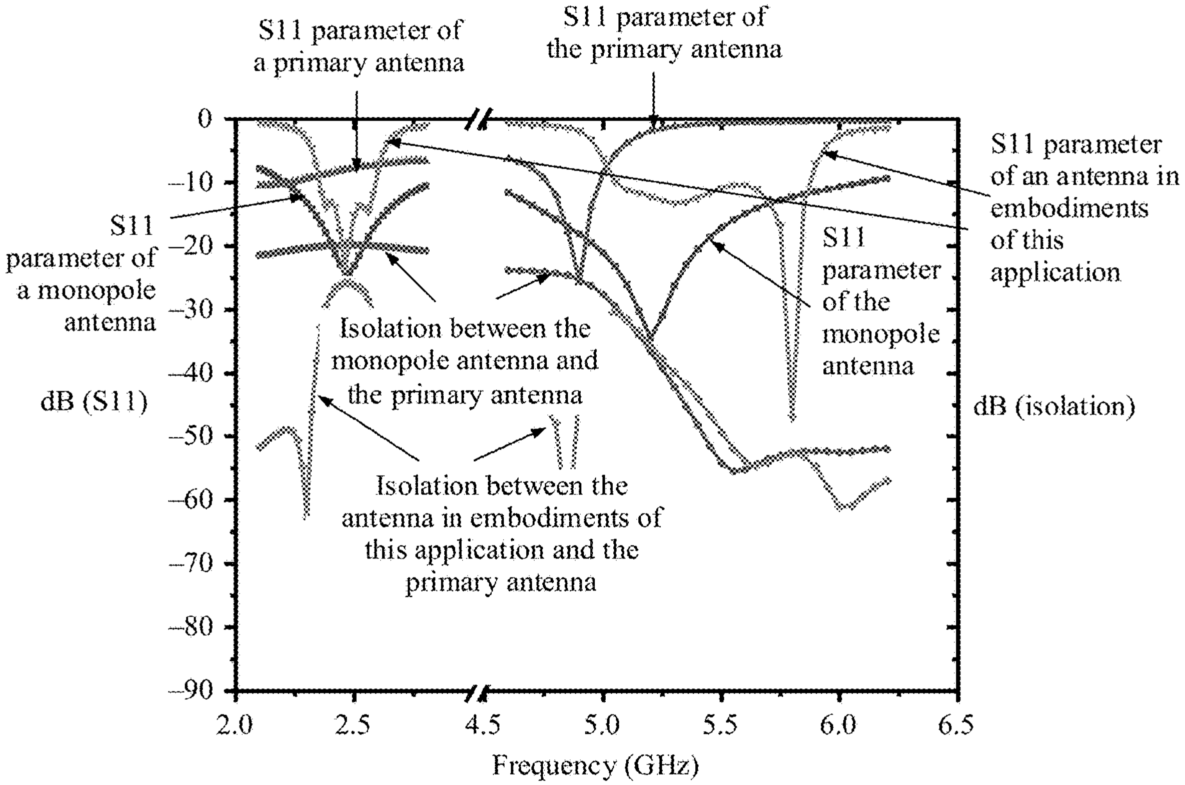
FIG. 26 is a comparative effect curve diagram of an S11 parameter and antenna efficiency of each antenna of an electronic device obtained by testing simulation effect of each of an electronic device that uses a monopole antenna as a dual-band Wi-Fi antenna and an electronic device that uses an antenna according to an embodiment of this application as a dual-band Wi-Fi antenna.

Simulation effect is analyzed on the electronic device shown in FIG. 10 and the electronic device shown in FIG. 25 through simulation software, to obtain an effect curve diagram shown in FIG. 26. FIG. 26 is a comparative effect curve diagram of an S11 parameter and antenna efficiency of each antenna of an electronic device obtained by testing simulation effect of each of an electronic device that uses a monopole antenna as a dual-band Wi-Fi antenna and an electronic device that uses an antenna according to an embodiment of this application as a dual-band Wi-Fi antenna.

Obtained simulation data of the monopole antenna from the effect curve diagram shown in FIG. 26 is shown in Table 2. Obtained simulation data of the antenna applied to a Wi-Fi 2.4 GHz frequency band in this embodiment of this application from the effect curve diagram shown in FIG. 26 is shown in Table 3, and simulation data of the antenna applied to a Wi-Fi 5 GHz frequency band in this embodiment of this application from the effect curve diagram shown in FIG. 26 is shown in Table 4 (with reference to FIG. 13 to FIG. 15 for understanding).

TABLE 4

| Parameter | Value |
|---|---|
| Length $L1_A$ (mm) of a bracket body 211A | 8 |
| Height h1 (mm) of a connection portion 213A | 3.8 |
| Thickness h2 (mm) of a PCB 20A | 1.0 |
| Height difference h3 (mm) between a second end of a secondary radiator section 112A and a second end of a primary radiator section 131A | 1.2 |
| Height difference h4 (mm) between a second end of a secondary radiator section 122A and a second end of a primary radiator section 131A | 1.0 |
| Length Ls1 (mm) of a horizontal part of a primary radiator section 111A | 4.6 |
| Length Ls2 (mm) of a horizontal part of a primary radiator section 121A | 5.1 |
| Spacing ds1 (mm) | 1.5 |
| Spacing ds2 (mm) | 0.4 |
| Length Lf (mm) of a second node 182A in a third direction L | 4.8 |
| Length Wf (mm) of a first node 181A in the third direction L | 0.5 |
| Operating frequency band of an antenna | 4.8 GHz to 6.0 GHz |

It can be learned from FIG. 26 that, in a Wi-Fi frequency band, for example, a Wi-Fi 5 GHz frequency band, an S11 parameter of the antenna in this embodiment of this application is less than −6 dB, and isolation from a primary antenna is relatively high. However, outside the operating frequency band, isolation between the antenna in this embodiment of this application and the primary antenna decreases sharply. It can be learned that, compared with isolation between the monopole antenna and the primary antenna, the isolation between the antenna in this embodiment of this application and the primary antenna can be greatly improved without affecting normal operation.

Figure 27A:
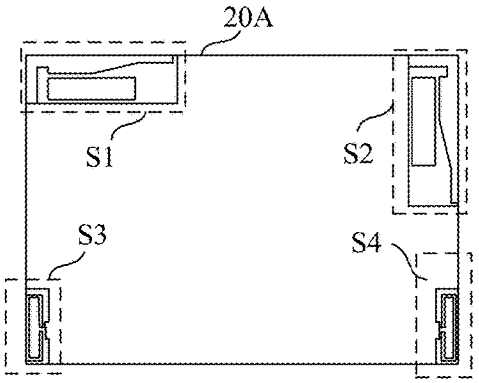
FIG. 27*a* is a schematic diagram of a front layout structure of a Wi-Fi antenna and a communications antenna of an electronic device in a reference design, where the Wi-Fi antenna uses a loop antenna.
Figure 27B:
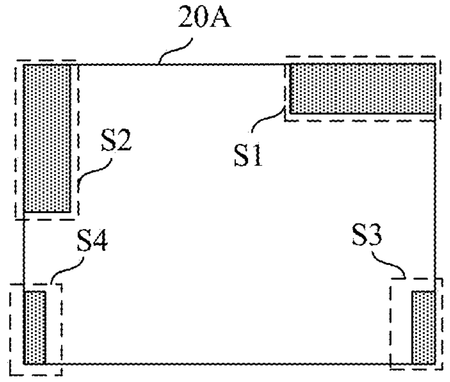
FIG. 27*b* is a schematic diagram of a rear layout structure of a Wi-Fi antenna and a communications antenna of an electronic device in a reference design, where the Wi-Fi antenna uses a loop antenna.
Figure 27C:
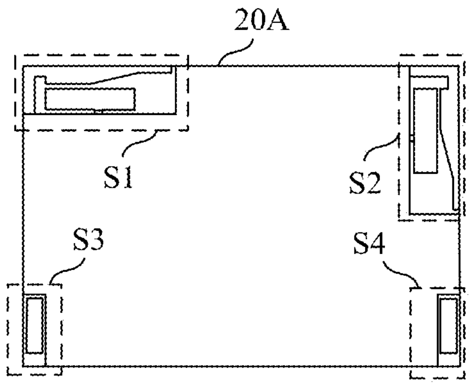
FIG. 27*c* is a schematic diagram of a front layout structure of a Wi-Fi antenna and a communications antenna of an electronic device according to an embodiment of this application, where the Wi-Fi antenna uses an antenna in this embodiment of this application.
Figure 27D:
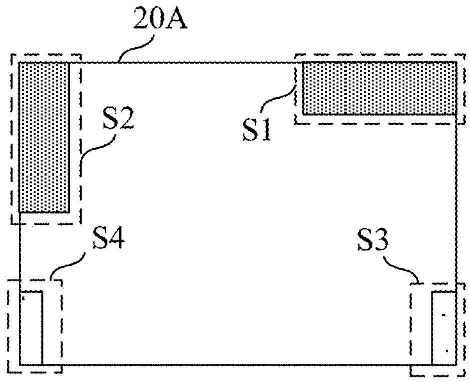
FIG. 27*d* is a schematic diagram of a rear layout structure of a Wi-Fi antenna and a communications antenna of an electronic device according to an embodiment of this application, where the Wi-Fi antenna uses an antenna in this embodiment of this application.

Refer to FIG. 27*a* to FIG. 27*d*. FIG. 27*a* and FIG. 27*b* are respectively a schematic diagram of a front layout structure and a schematic diagram of a rear layout structure of a Wi-Fi antenna and a communications antenna of an electronic device in a reference design. The Wi-Fi antenna uses a loop antenna (or may be referred to as a Loop antenna). FIG. 27*c* and FIG. 27*d* are respectively a schematic diagram of a front layout structure and a schematic diagram of a rear layout structure of a Wi-Fi antenna and a communications antenna of an electronic device according to an embodiment of this application. The Wi-Fi antenna uses an antenna in this embodiment of this application.

As shown in FIG. 27*c*, the communications antenna (or may be referred to as Long Term Evolution, LTE antenna) of the electronic device is located in a first area S1 and a second area S2 of a PCB 20A, and the communications antenna uses a printed coupling antenna. The antenna in this embodiment of this application is disposed on the PCB 20A of the electronic device as the Wi-Fi antenna, and the PCB 20A is used as the ground of this embodiment. The electronic device includes two Wi-Fi antennas, which are respectively located in a third area S3 and a fourth area S4 of the PCB 20A. In addition, as shown in FIG. 27*d*, a metal ground formed by the PCB is disposed on a rear side of the antenna in this embodiment of this application.

Structures and antenna layout space sizes of the electronic device shown in FIG. 27*a* and the electronic device shown in FIG. 27*c* are basically the same. A difference lies in that the Wi-Fi antenna in FIG. 27*a* uses the loop antenna (or may be referred to as the loop antenna). In addition, as shown in FIG. 27*b*, a rear side of the loop antenna is pure clearance.

Simulation effect is analyzed through simulation software on the electronic device (as shown in FIG. 27*a* and FIG. 27*b*) that uses the loop antenna as the Wi-Fi antenna and the electronic device (as shown in FIG. 27*c* and FIG. 27*d*) that uses the antenna in this embodiment of this application as the Wi-Fi antenna, to obtain an effect curve diagram shown in FIG. 14.

Figure 28:
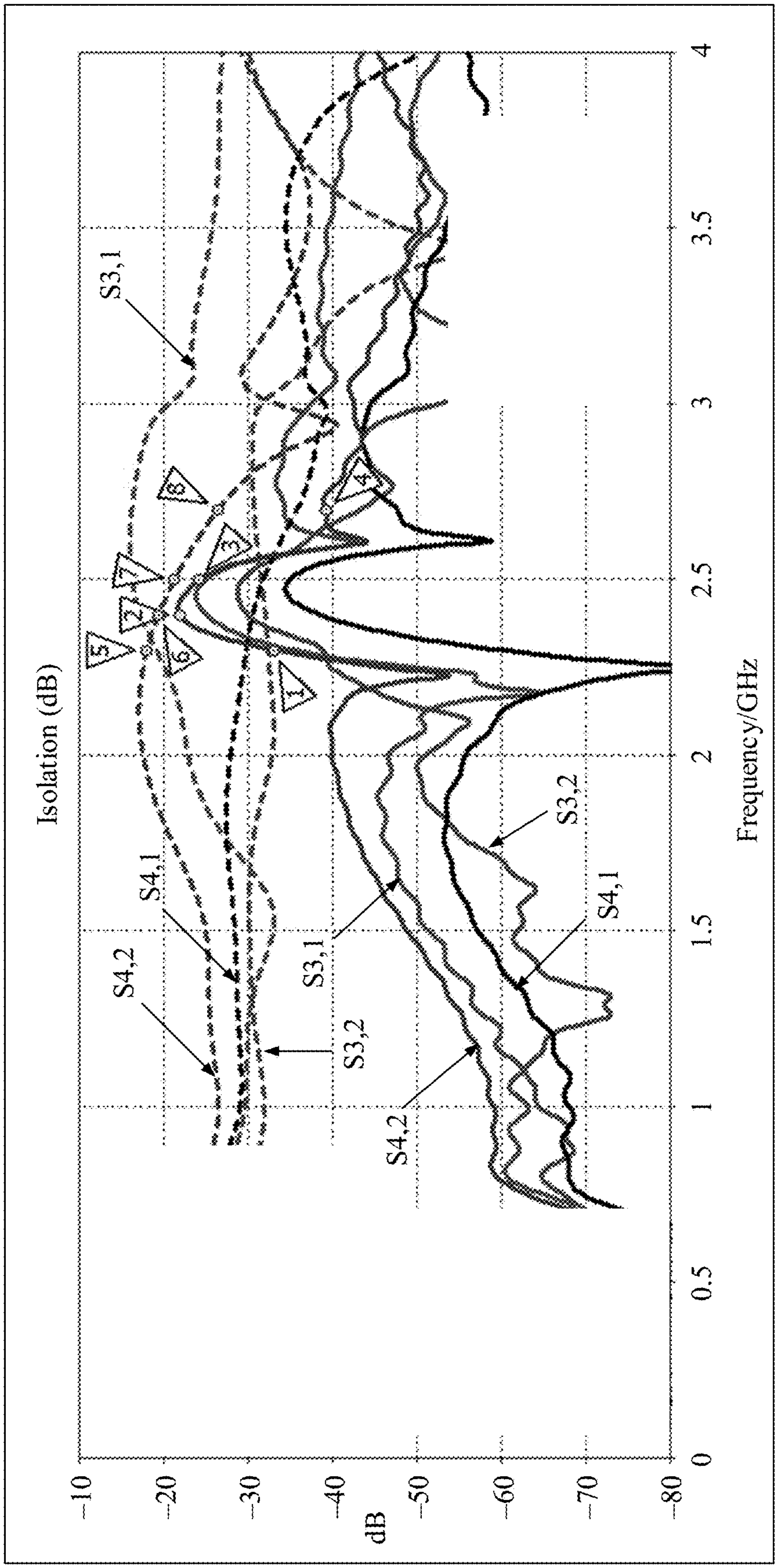
FIG. 28 is a comparative effect curve diagram of isolation of a Wi-Fi antenna and a communications antenna of an electronic device obtained by testing simulation effect of each of an electronic device that uses a loop antenna as a Wi-Fi antenna and an electronic device that uses an embodiment of this application as a Wi-Fi antenna.

FIG. 28 is a comparative effect curve diagram of isolation of a Wi-Fi antenna and a communications antenna of an electronic device obtained by testing simulation effect of each of an electronic device that uses a loop antenna as a Wi-Fi antenna and an electronic device that uses an embodiment of this application as a Wi-Fi antenna.

In FIG. 28, a dashed line indicates isolation between loop antennas located in different areas of the electronic device and communications antennas located in different areas of the electronic device. For example, S3, 1 indicates isolation between a loop antenna located in a third area S3 and a communications antenna located in a first area S1, S3,2 indicates isolation between the loop antenna located in the third area S3 and a communications antenna located in a second area S2, and S4,1 and S4,2 is similar to S3, 1 and S3,2. Details are not described herein. A solid line indicates isolation between antennas in this embodiment of this application located in different areas of the electronic device and the communications antenna located in different areas of the electronic device. For example, S3, 1 indicates isolation between an antenna in this embodiment of this application located in a third area S3 and a communications antenna located in the first area S1, and S3,2 indicates isolation between an antenna in this embodiment of this application located in the third area S3 and a communications antenna located in the second area S2, and S4,1 and S4,2 are similar to S3, 1 and S3,2. Details are not described herein.

It can be learned from FIG. 28 that, compared with the isolation between the loop antenna and the communications antenna, isolation between the antenna in this embodiment of this application and the communications antenna is significantly improved. For example, the isolation between the antenna in this embodiment of this application located in the third area S3 and the communications antenna located in the first area S1 is improved by about 15 dB at 2.3 GHz, and is improved by about 8 dB at 2.4 GHz outside an operating frequency band. Isolation between an antenna in this embodiment of this application located in a fourth area S4 and the communications antenna located in the second area S2 is improved by about 15 dB at 2.3 GHZ, and is improved by about 3 dB at 2.4 GHz outside the operating frequency band.

In addition, it should be noted that FIG. 28 shows only the effect curve of the Wi-Fi 2.4 GHz frequency band, and an effect curve of a Wi-Fi 5 GHz frequency band is similar to the effect curve of the Wi-Fi 2.4 GHz frequency band.

Figure 29:
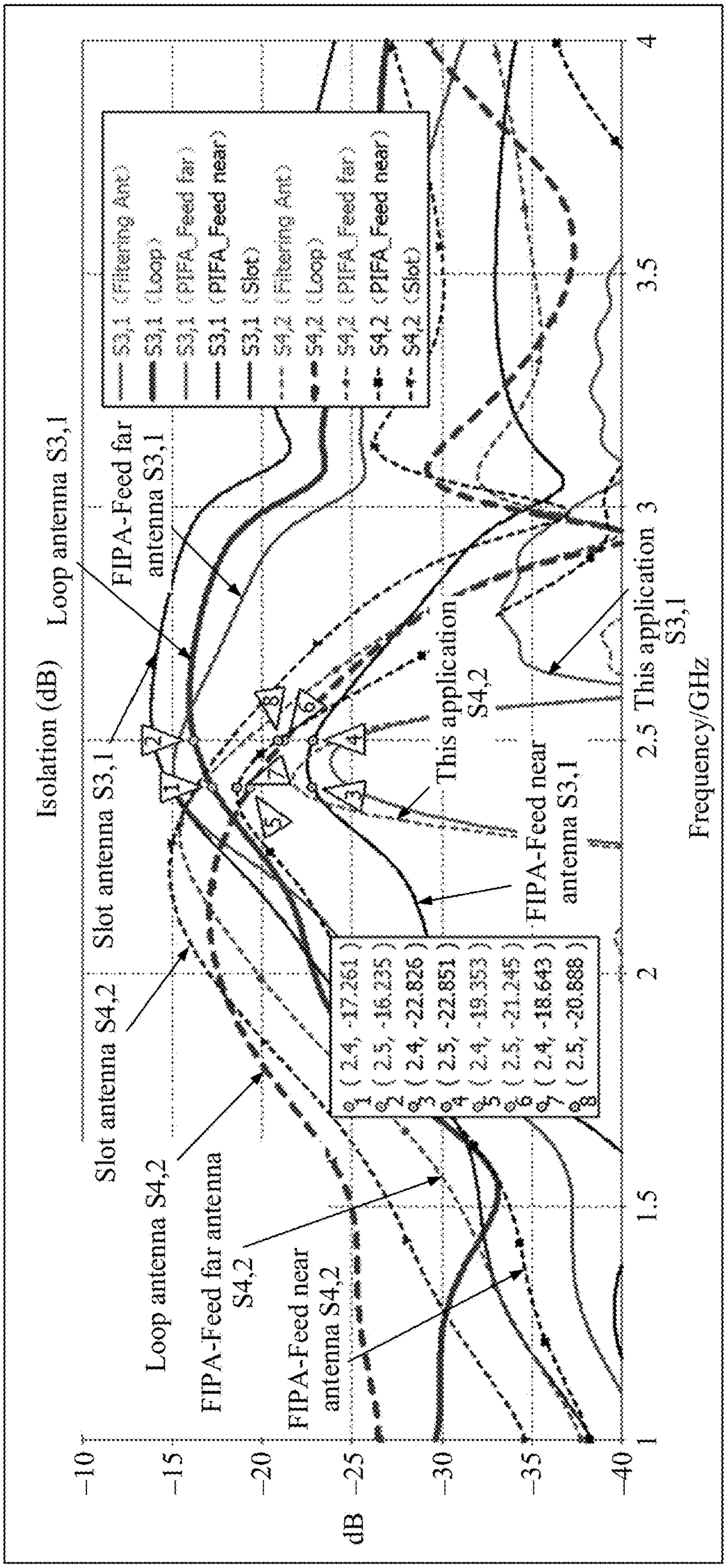
FIG. 29 is a curve diagram of comparison effect of isolation between a Wi-Fi antenna and a communications antenna of an electronic device obtained by analyzing simulation effect of the electronic device that uses different types of antennas as Wi-Fi antennas.

FIG. 29 is a curve diagram of comparison effect of isolation between a Wi-Fi antenna and a communications antenna of an electronic device obtained by analyzing simulation effect of the electronic device that uses different types of antennas as Wi-Fi antennas.

In addition to the loop antenna mentioned above and the antenna in an embodiment of this application, different types of antennas further include a slot antenna (or may be referred to as a slot antenna), a first planar inverted F-shaped antenna (PIFA-Feed far), and a second planar inverted F-shaped antenna (PIFA-Feed near). The first planar inverted F-shaped antenna may be understood as a planar inverted F-shaped antenna whose feeding connection point on a radiator is relatively away from an LTE communications antenna. The second planar inverted F-shaped antenna may be understood as a planar inverted F-shaped antenna whose feeding connection point on a radiator is relatively close to the LTE communications antenna. In FIG. 29, a "PIFA-Feed far antenna S4,2" curve shown by an arrow indicates isolation between a PIFA-Feed far antenna located in a fourth area S4 of the electronic device and a communications antenna located in a second area S2 of the electronic device. A "slot antenna S3,1" curve shown by an arrow indicates isolation between a slot antenna located in a third area S3 of the electronic device and a communications antenna located in a first area S1 of the electronic device. Understanding of another curve is similar to the foregoing example, and details are not described herein.

It can be learned from FIG. 29 that, compared with isolation between other different types of antennas and the communications antenna, isolation between the antenna in this embodiment of this application and the communications antenna is significantly improved.

It can be learned that, the antenna in this embodiment of this application is used as the Wi-Fi antenna, so that the isolation between the Wi-Fi antenna and the communications antenna can be greatly improved. Especially in a frequency band away from an edge frequency point (or may be understood as the target frequency point mentioned above), the isolation between the different-frequency antennas is improved by up to about 15 dB. This helps resolve coexistence of the Wi-Fi antenna and the communications antenna. Especially, in an application scenario in which there is no guard band between a B40 frequency band (2300 MHz to 2400 MHZ) and a Wi-Fi/BT frequency band (2400 MHz to 2483.5 MHz), or in an application scenario in which there is only a 16 M guard band between a B7/B40 frequency band (2500 MHz to 2570 MHz) and the Wi-Fi/BT frequency band (2400 MHz to 2483.5 MHz), poor isolation between the Wi-Fi antenna and the communications antenna can be effectively resolved, and anti-interference capabilities of a Wi-Fi system and an LTE system (or may be understood as a communications system) in the electronic device is improved. This improves the anti-interference capability of the electronic device.

It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An antenna, comprising:

a plurality of radiators, wherein the plurality of radiators comprise a first radiator, a second radiator, and a third radiator that are spaced from each other side by side in a first direction on a same plane, the second radiator and the third radiator are respectively located on two sides of the first radiator, a first gap is formed between the second radiator and the first radiator, and a second gap is formed between the third radiator and the first radiator; and the first radiator, the second radiator, and the third radiator are all spaced from a ground and disposed opposite to the ground in a second direction;

a feeding element, wherein one end of the feeding element is connected to a feeding connection point of the first radiator, and the other end of the feeding element is connected to a feeding point; and a first ground element, a second ground element, a third ground element, and a fourth ground element that are spaced from each other in the first direction, wherein one end of the first ground element is connected to a first ground point of the first radiator, and the other end of the first ground element is grounded; one end of the second ground element is connected to a second ground point of the first radiator, and the other end of the second ground element is grounded; both the first ground element and the second ground element are spaced from the feeding element in a third direction; one end of the third ground element is connected to a ground point of the second radiator, and the other end of the third ground element is grounded; and one end of the fourth ground element is connected to a ground point of the third radiator, and the other end of the fourth ground element is grounded;

wherein the first direction, the second direction, and the third direction are perpendicular to each other, the first direction is parallel to a width direction of the first radiator, and the third direction is parallel to a length direction of the first radiator; and wherein in the third direction, both ends of the second radiator are located between two ends of the first radiator, and both ends of the third radiator are located between two ends of the second radiator.

2. The antenna according to claim 1, wherein the first gap enables an electrical coupling strength between the first radiator and the second radiator to be a first target strength at a first target frequency point, and the second gap enables an electrical coupling strength between the first radiator and the third radiator to be a second target strength at a second target frequency point; and an operating frequency band of the antenna is between the first target frequency point and the second target frequency point.

3. The antenna according to claim 2, wherein the antenna has a radiation null at the first target frequency point and the second target frequency point.

4. The antenna according to claim 1, wherein the first radiator, the second radiator, and the third radiator are all in a strip shape.

5. The antenna according to claim 1, wherein each of the plurality of radiators is capable of generating at least two resonances having resonance frequency points that are in different operating frequency bands of the antenna.

6. The antenna according to claim 5, wherein a first resonance frequency point of each of the plurality of radiators is in a first operating frequency band of the antenna.

7. The antenna according to claim 6, wherein a second resonance frequency point of each of the plurality of radiators is in a second operating frequency band of the antenna.

8. The antenna according to claim 7, wherein in the third direction, radiator sections in the first radiator that are located on two sides of the feeding connection point are respectively configured to generate a first resonance frequency point and a second resonance frequency point of the first radiator;

in the third direction, radiator sections in the second radiator that are located on two sides of the ground point of the second radiator are respectively configured to generate a first resonance frequency point and a second resonance frequency point of the second radiator;

in the third direction, radiator sections in the third radiator that are located on two sides of the ground point of the third radiator are respectively configured to generate a first resonance frequency point and a second resonance frequency point of the third radiator;

the first resonance frequency point of the first radiator, the first resonance frequency point of the second radiator, and the first resonance frequency point of the third radiator are all in the first operating frequency band of the antenna; and the second resonance frequency point of the first radiator, the second resonance frequency point of the second radiator, and the second resonance frequency point of the third radiator are all in the second operating frequency band of the antenna.

9. The antenna according to claim 8, wherein in the third direction, in the first radiator, an electrical length of a radiator section located on one side of the feeding connection point is ¼ of an operating wavelength corresponding to the first resonance frequency point of the first radiator; and an electrical length of a radiator section located on the other side of the feeding connection point is ¼ of an operating wavelength corresponding to the second resonance frequency point of the first radiator;

in the third direction, in the second radiator, an electrical length of a radiator section located on one side of the ground point of the second radiator is ¼ of an operating wavelength corresponding to the first resonance frequency point of the second radiator; and an electrical length of a radiator section located on the other side of the ground point of the second radiator is ¼ of an operating wavelength corresponding to the second resonance frequency point of the second radiator; and in the third direction, in the third radiator, an electrical length of a radiator section located on one side of the ground point of the third radiator is ¼ of an operating wavelength corresponding to the first resonance frequency point of the third radiator; and an electrical length of a radiator section located on the other side of the ground point of the third radiator is ¼ of an operating wavelength corresponding to the second resonance frequency point of the third radiator.

10. The antenna according to claim 1, wherein in the first direction, the first ground point is located between the second ground point and the ground point of the second radiator, and a spacing between the first ground point and the second ground point, a spacing between the first ground point and the ground point of the second radiator, and a spacing between the second ground point and the ground point of the third radiator are all less than or equal to 10 mm.

11. The antenna according to claim 1, wherein in the first direction, the spacing d1 between the first ground point and the second ground point is 0.4 mm≤d1≤4.4 mm, the spacing d2 between the first ground point and the ground point of the second radiator is 0.6 mm≤d2≤4.6 mm, and the spacing d3 between the second ground point and the ground point of the third radiator is: 0.5 mm≤d3≤4.5 mm.

12. The antenna according to claim 1, wherein in the third direction, a spacing between the first ground point and the second ground point, a spacing between the ground point of the second radiator and the first ground point, and a spacing between the ground point of the third radiator and the second ground point are all less than or equal to 10 mm.

13. The antenna according to claim 1, wherein at least some of the first ground element, the second ground element, the third ground element, and the fourth ground element are disposed in a staggered manner in the third direction.

14. The antenna according to claim 1, wherein a height h0 of the antenna is 4 mm≤h0≤6 mm.

15. The antenna according to claim 1, wherein the feeding element, the first ground element, the second ground element, the third ground element, and the fourth ground element are all disposed in an extended manner in the second direction.

16. An electronic device, comprising an antenna, the antenna comprising, a plurality of radiators, wherein the plurality of radiators comprise a first radiator, a second radiator, and a third radiator that are spaced from each other side by side in a first direction on a same plane, the second radiator and the third radiator are respectively located on two sides of the first radiator, a first gap is formed between the second radiator and the first radiator, and a second gap is formed between the third radiator and the first radiator; and the first radiator, the second radiator, and the third radiator are all spaced from a ground and disposed opposite to the ground in a second direction;

a feeding element, wherein one end of the feeding element is connected to a feeding connection point of the first radiator, and the other end of the feeding element is connected to a feeding point; and a first ground element, a second ground element, a third ground element, and a fourth ground element that are spaced from each other in the first direction, wherein one end of the first ground element is connected to a first ground point of the first radiator, and the other end of the first ground element is grounded; one end of the second ground element is connected to a second ground point of the first radiator, and the other end of the second ground element is grounded; both the first ground element and the second ground element are spaced from the feeding element in a third direction; one end of the third ground element is connected to a ground point of the second radiator, and the other end of the third ground element is grounded; and one end of the fourth ground element is connected to a ground point of the third radiator, and the other end of the fourth ground element is grounded;

wherein the first direction, the second direction, and the third direction are perpendicular to each other, the first direction is parallel to a width direction of the first radiator, and the third direction is parallel to a length direction of the first radiator; and wherein in the third direction, both ends of the second radiator are located between two ends of the first radiator, and both ends of the third radiator are located between two ends of the second radiator.

17. The electronic device according to claim 16, wherein each of the first radiator, the second radiator, and the third radiator is formed by a conductive element of the electronic device; and each of the feeding element, the first ground element, the second ground element, the third ground element, and the fourth ground element is formed by a conductive element of the electronic device.

18. The electronic device according to claim 16, wherein each of the plurality of radiators is capable of generating at least two resonances including a first resonance frequency point and a second resonance frequency point, wherein the first resonance frequency point of each of the plurality of radiators is in a first operating frequency band of the antenna, and the second resonance frequency point of each of the plurality of radiators is in a second operating frequency band of the antenna.

* * * * *